US012597220B2

(12) United States Patent
Nomura et al.

(10) Patent No.: US 12,597,220 B2
(45) Date of Patent: Apr. 7, 2026

(54) INFORMATION PROCESSING DEVICE, INFORMATION PROCESSING METHOD, AND COMPUTER PROGRAM

(71) Applicant: Sony Interactive Entertainment Inc., Tokyo (JP)

(72) Inventors: Masanori Nomura, Tokyo (JP); Takanori Minamino, Tokyo (JP); Shoi Yonetomi, Tokyo (JP); Yurika Mulase, Tokyo (JP); Mitsuru Nishibe, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 83 days.

(21) Appl. No.: 18/578,323

(22) PCT Filed: Jun. 21, 2022

(86) PCT No.: PCT/JP2022/024696
§ 371 (c)(1),
(2) Date: Jan. 11, 2024

(87) PCT Pub. No.: WO2023/002792
PCT Pub. Date: Jan. 26, 2023

(65) Prior Publication Data
US 2024/0378835 A1      Nov. 14, 2024

(30) Foreign Application Priority Data

Jul. 21, 2021      (JP) ................................. 2021-120404

(51) Int. Cl.
G06T 19/20 (2011.01)
A63F 13/212 (2014.01)
(Continued)

(52) U.S. Cl.
CPC ............ G06T 19/20 (2013.01); A63F 13/213 (2014.09); A63F 13/25 (2014.09); A63F 13/69 (2014.09);
(Continued)

(58) Field of Classification Search
CPC ......... G06T 19/20; G06T 7/74; G06T 19/006; G06T 2207/10021; G06T 2219/2021;
(Continued)

(56) References Cited

U.S. PATENT DOCUMENTS 10,241,566 B2 * 3/2019 Sawyer .............. G02B 27/0093
10,803,663 B2 * 10/2020 Wang ...................... G06F 3/011
(Continued)

FOREIGN PATENT DOCUMENTS

JP        2017-130793 A       7/2017
WO        2019/225115 A1      11/2019

OTHER PUBLICATIONS

International Search Report and Written Opinion mailed on Aug. 30, 2022, received for PCT Application PCT/JP2022/024696, filed on Jun. 21, 2022, 8 pages including English Translation.

*Primary Examiner* — Vijay Shankar
(74) *Attorney, Agent, or Firm* — Kilpatrick Townsend & Stockton LLP

(57)        ABSTRACT

An image forming device automatically detects a play area in reference to a camera image that indicates a space around a user and that is captured by a camera of a head mounted display. The image forming device causes the head mounted display to display an image representing the play area automatically detected. The image forming device receives an operation performed by the user to edit the play area from a controller, and changes a shape of the play area according to the operation.

3 Claims, 18 Drawing Sheets

(51) Int. Cl.

| | |
|---|---|
| *A63F 13/213* | (2014.01) |
| *A63F 13/25* | (2014.01) |
| *A63F 13/69* | (2014.01) |
| *G06T 7/73* | (2017.01) |
| *G06T 19/00* | (2011.01) |
| *A63F 13/211* | (2014.01) |

(52) U.S. Cl.
CPC .............. *G06T 7/74* (2017.01); *G06T 19/006* (2013.01); *A63F 13/211* (2014.09); *A63F 13/212* (2014.09); *A63F 2300/8082* (2013.01); *G06T 2207/10021* (2013.01); *G06T 2219/2021* (2013.01)

(58) Field of Classification Search
CPC ........ G06T 19/00; A63F 13/213; A63F 13/25; A63F 13/69; A63F 13/211; A63F 13/212; A63F 2300/8082; A63F 13/428; A63F 13/5255; A63F 13/235; G02B 27/017
See application file for complete search history.

(56) References Cited

U.S. PATENT DOCUMENTS

| | | | | |
|---|---|---|---|---|
| 10,839,544 | B2 * | 11/2020 | Aratani | .................... G06T 7/60 |
| 11,334,145 | B2 * | 5/2022 | Sawyer | .................. G06F 3/011 |
| 2016/0124502 | A1 | 5/2016 | Sawyer et al. | |
| 2017/0148167 | A1 | 5/2017 | Aratani | |
| 2019/0043259 | A1 | 2/2019 | Wang et al. | |
| 2019/0212812 | A1 * | 7/2019 | Sawyer | .................... G01S 5/16 |

* cited by examiner

F I G . 2
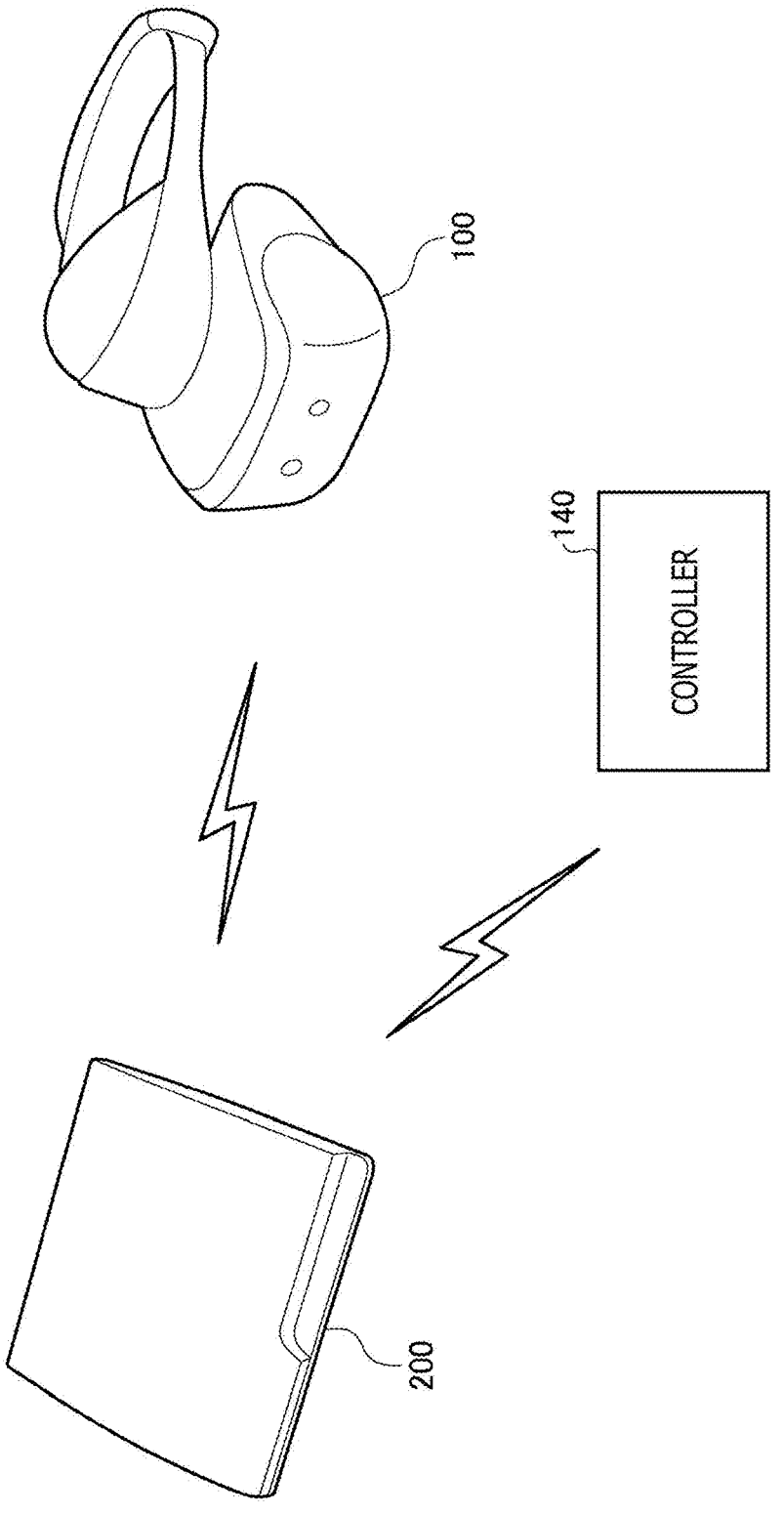

Figure 6:
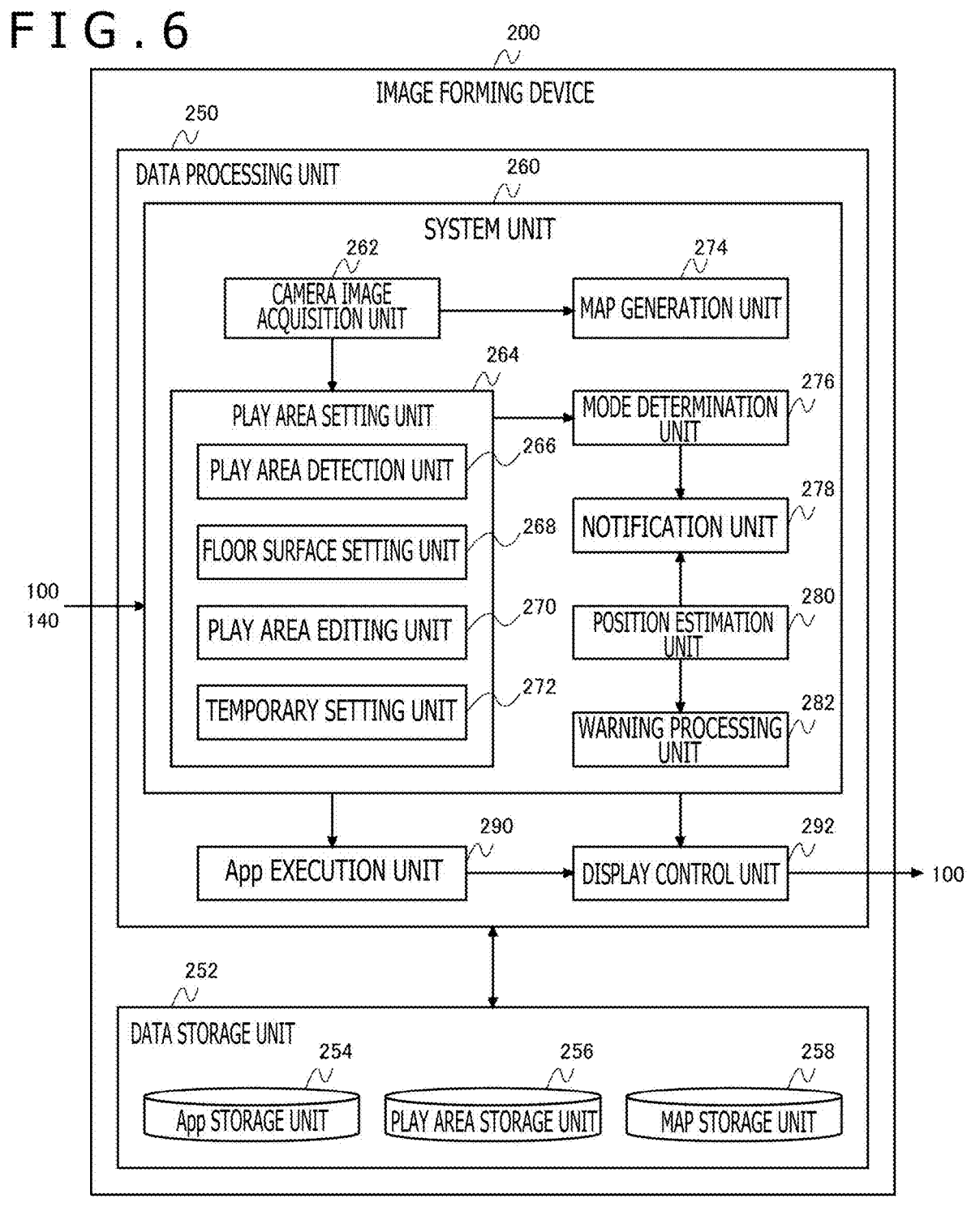

IMAGE FORMING DEVICE

250

DATA PROCESSING UNIT

260

SYSTEM UNIT

262
CAMERA IMAGE ACQUISITION UNIT

274
MAP GENERATION UNIT

264
PLAY AREA SETTING UNIT

266
PLAY AREA DETECTION UNIT

268
FLOOR SURFACE SETTING UNIT

270
PLAY AREA EDITING UNIT

272
TEMPORARY SETTING UNIT

276
MODE DETERMINATION UNIT

278
NOTIFICATION UNIT

280
POSITION ESTIMATION UNIT

282
WARNING PROCESSING UNIT

100
140

290
App EXECUTION UNIT

292
DISPLAY CONTROL UNIT → 100

252
DATA STORAGE UNIT

254
App STORAGE UNIT

256
PLAY AREA STORAGE UNIT

258
MAP STORAGE UNIT

F I G . 1 2
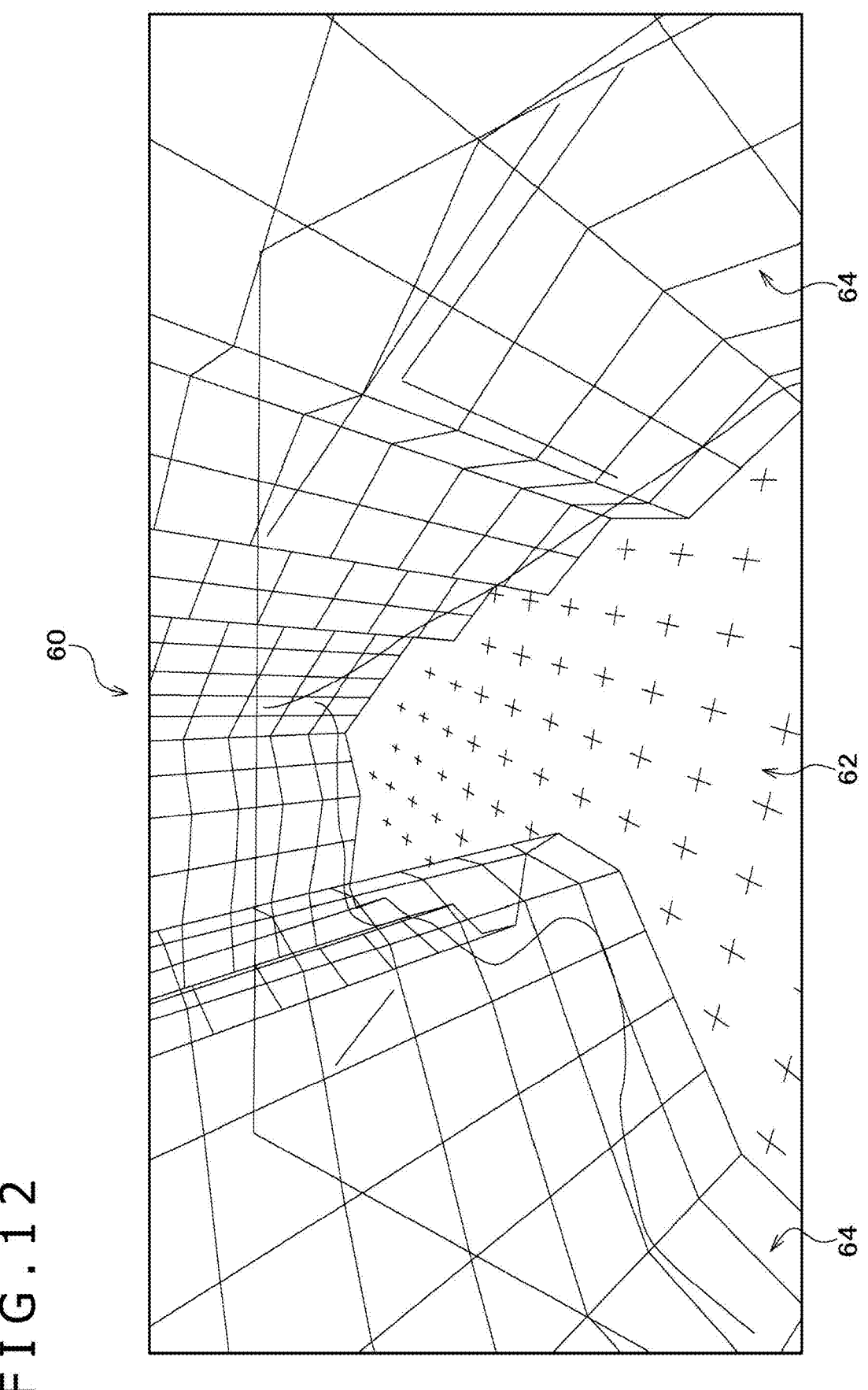

FIG.13
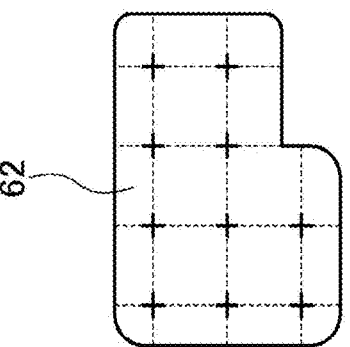
(d)
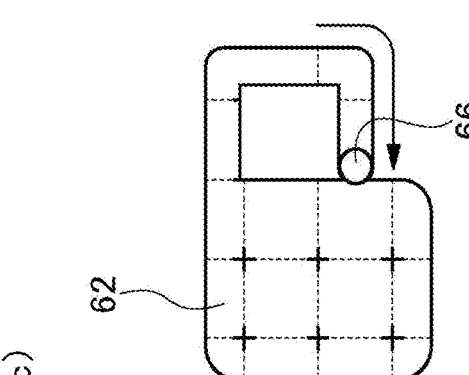
(c)
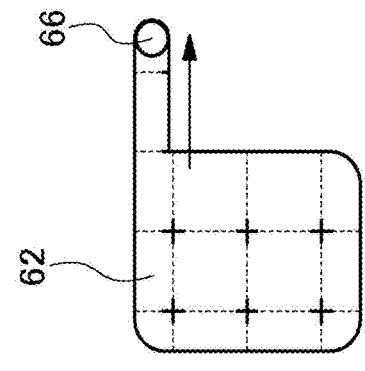
(b)
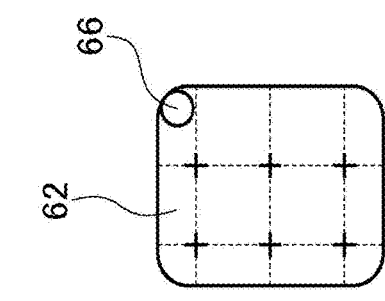
(a)

F I G . 1 4
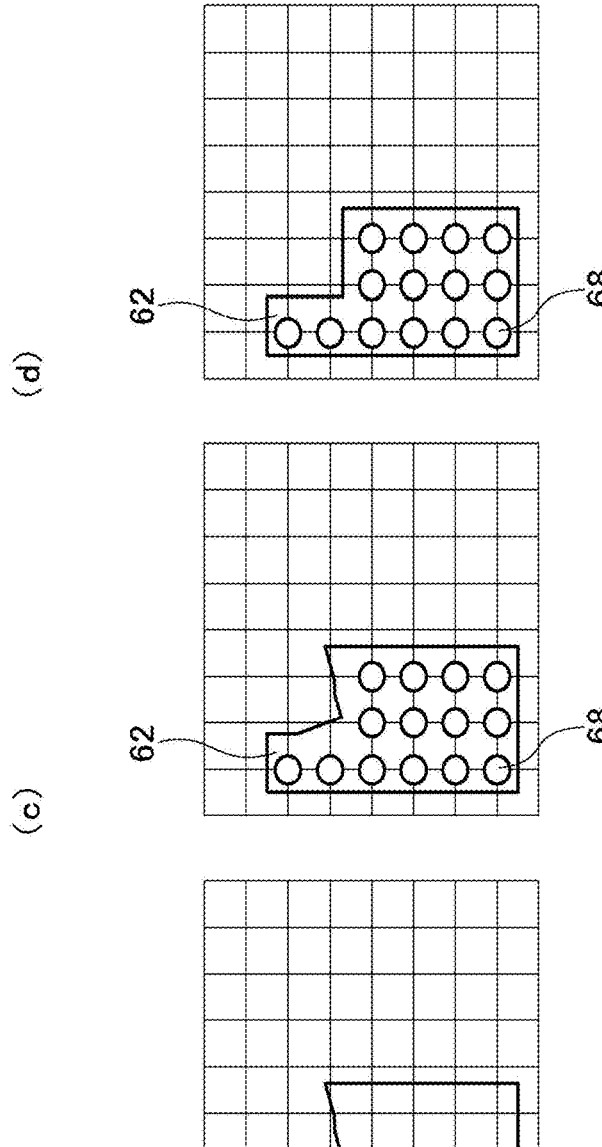
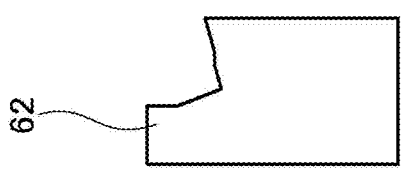

FIG.15
(a)
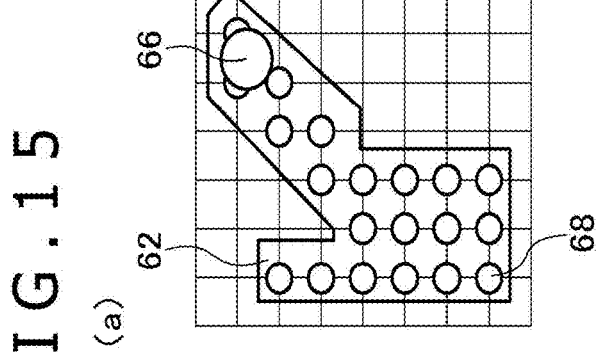
(b)
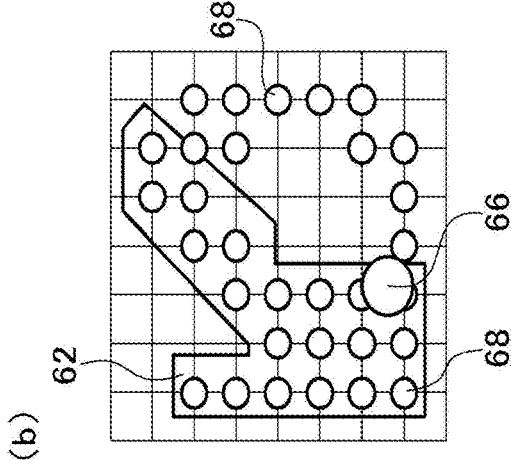
(c)
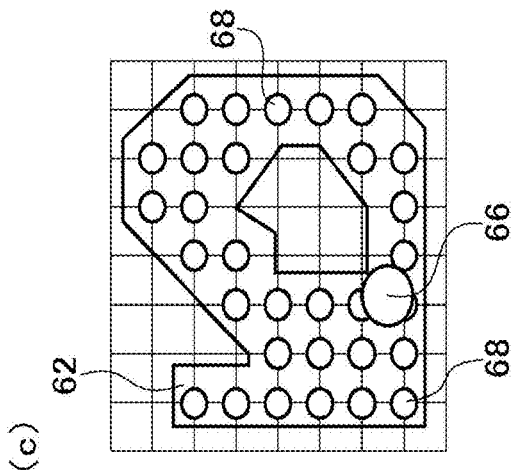
(d)
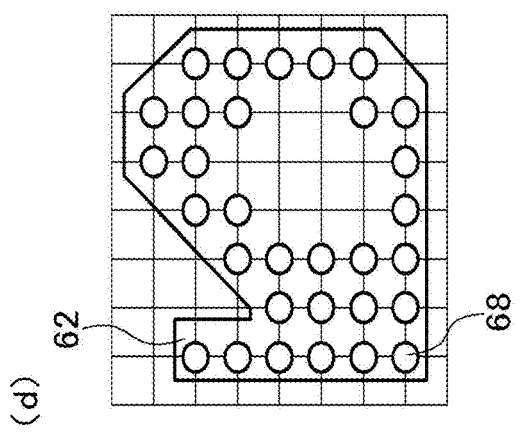
(e)
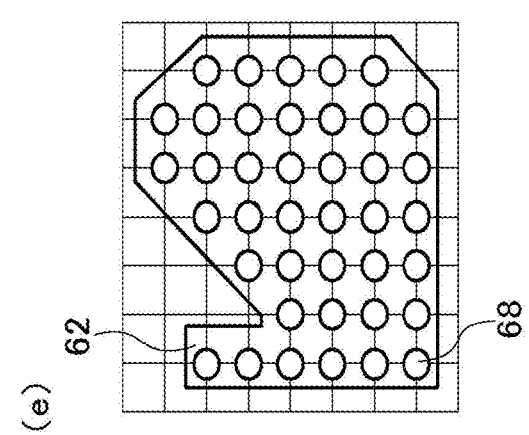

FIG.16
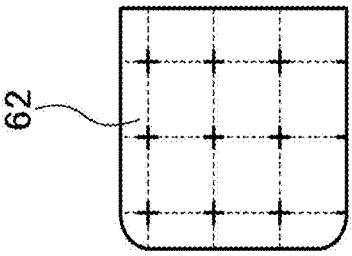
(d)
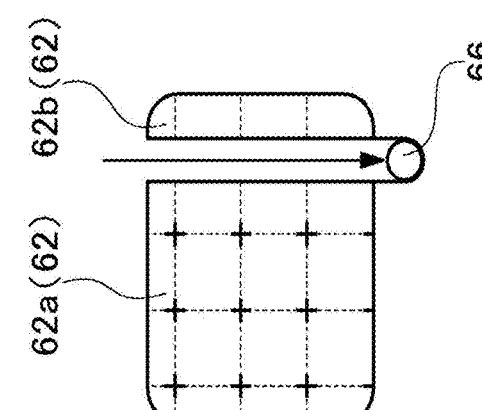
(c)
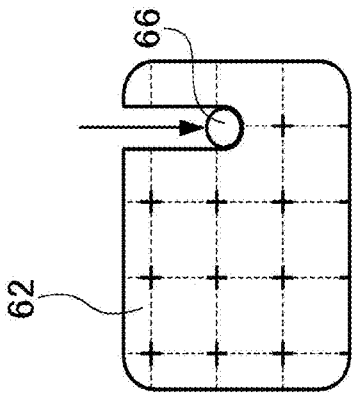
(b)
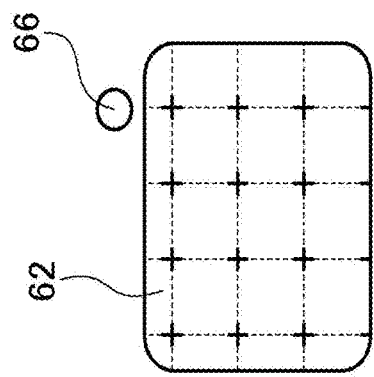
(a)

FIG.17
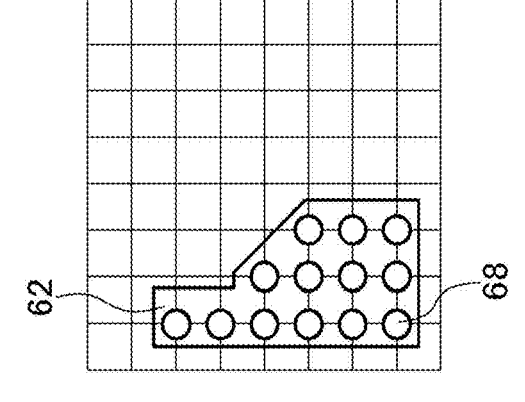
(d)
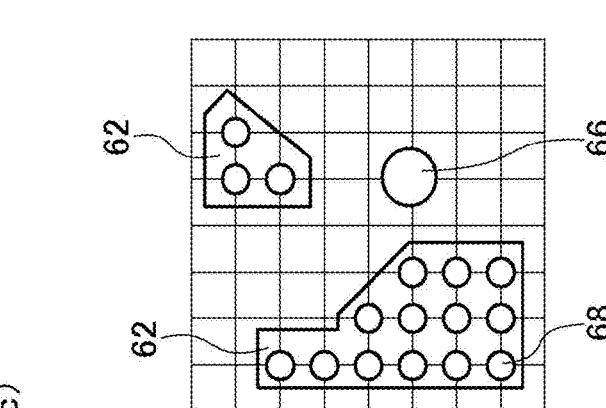
(c)
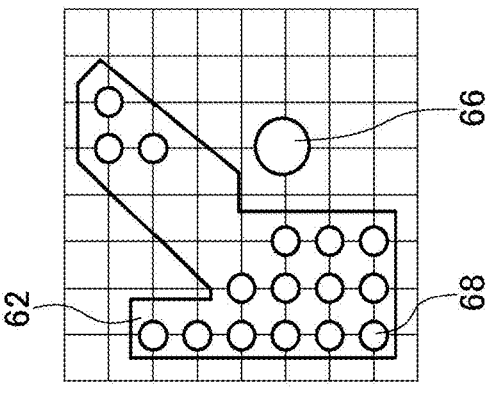
(b)
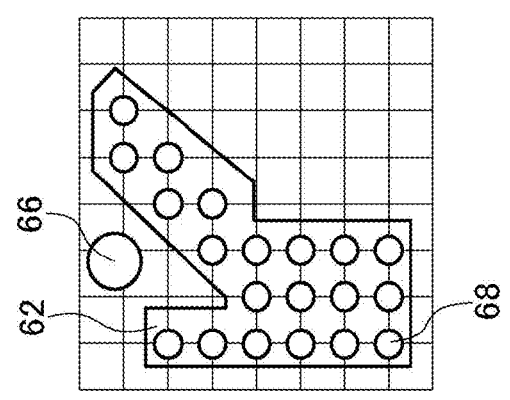
(a)

F I G . 1 9
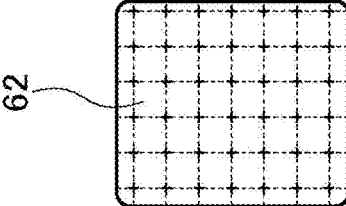
(a) 62
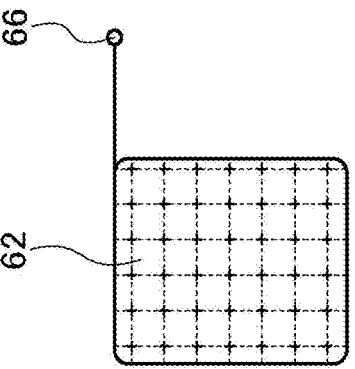
(b) 62    66
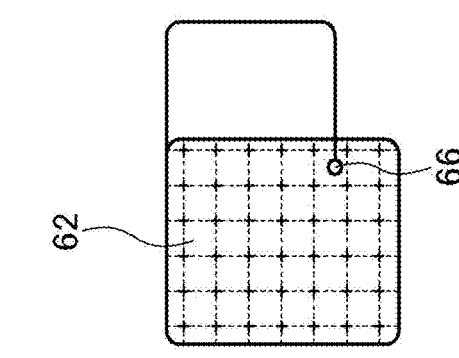
(c) 62    66
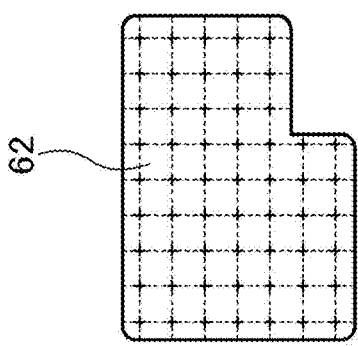
(d) 62

F I G . 2 0
(b)
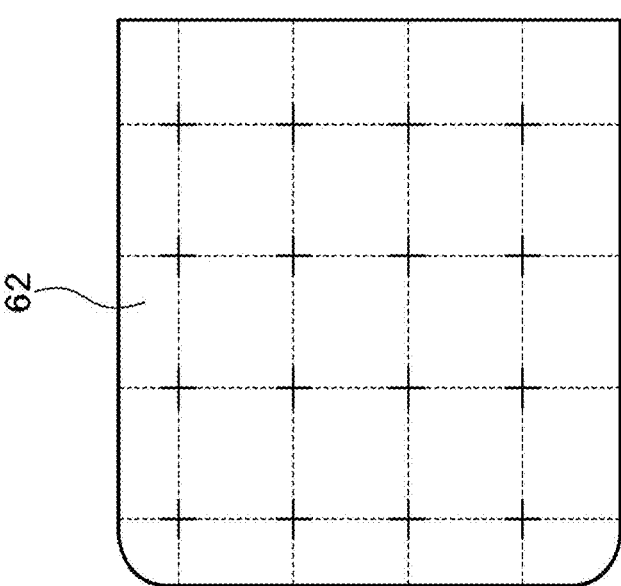
(a)
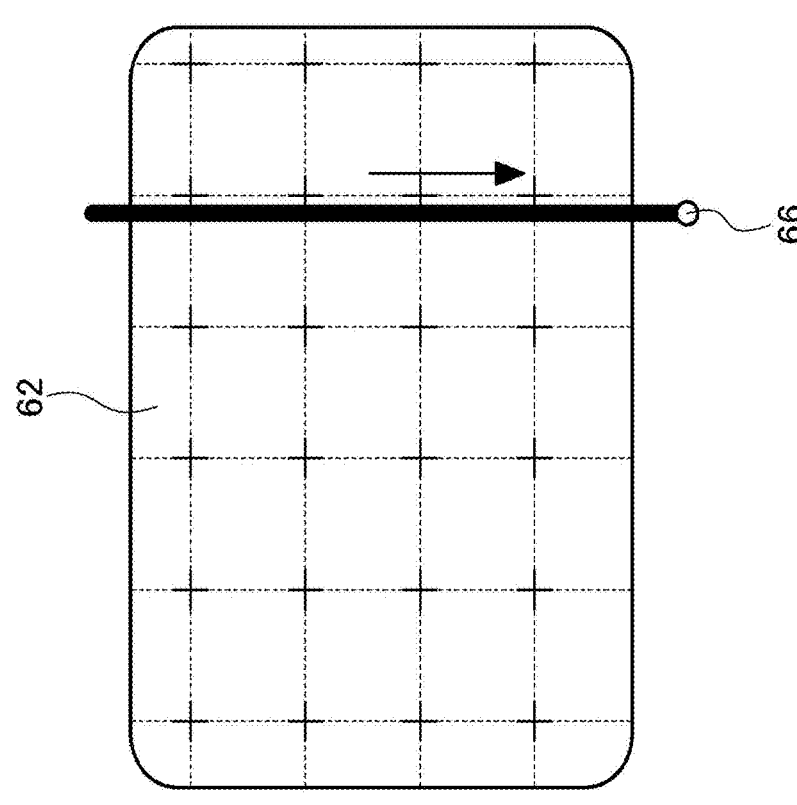

INFORMATION PROCESSING DEVICE, INFORMATION PROCESSING METHOD, AND COMPUTER PROGRAM

CROSS-REFERENCE TO RELATED APPLICATIONS

The present application is based on PCT filing PCT/JP2022/024696, filed Jun. 21, 2022, which claims priority from Japanese Patent Application No. 2021-120404, filed Jul. 21, 2021, the entire contents of each is incorporated herein by reference.

TECHNICAL FIELD

The present invention relates to a data processing technology, and particularly to an information processing device, an information processing method, and a computer program.

BACKGROUND ART

An image display system for allowing a user wearing a head mounted display to enjoy a target space freely from any viewpoint is widely used. For example, there is known electronic content which designates a virtual three-dimensional (3D) space as a display target and displays an image corresponding to a visual line direction of a user on a head mounted display to realize virtual reality (VR). Use of a head mounted display can increase a sense of immersion into a video and improve operability of an application such as a game. There has been further developed a walkthrough system which allows a user wearing a head mounted display to virtually walk around a space displayed as a video by physical movement with the head mounted display attached.

SUMMARY

Technical Problem

A range where a user wearing a head mounted display is movable during play of an application needs to be limited according to the size of a room of the user and the environment such as furniture and belongings disposed in the room of the user.

The present invention has been developed to solve the abovementioned problem. One object of the present invention is to provide a technology for achieving setting assistance of a play area where a user wearing a head mounted display is movable during play of an application.

Solution to Problem

For solving the above problem, an information processing device according to an aspect of the present invention includes a play area detection unit that automatically detects a play area where a user wearing a head mounted display is movable during play of an application, in reference to a camera image that indicates a space around the user and that is captured by a camera of the head mounted display, a display control unit that causes the head mounted display to display an image representing the play area automatically detected by the play area detection unit, and a play area editing unit that receives an operation performed by the user to edit the play area and changes a shape of the play area according to the operation.

Another aspect of the present invention is directed to an information processing method. This method is executed by a computer, and includes a step of automatically detecting a play area where a user wearing a head mounted display is movable during play of an application, in reference to a camera image that indicates a space around the user and that is captured by a camera of the head mounted display, a step of causing the head mounted display to display an image representing the automatically detected play area, and a step of receiving an operation performed by the user to edit the play area and changing a shape of the play area according to the operation.

Note that any combinations of the constituent elements described above and the expressions of the present invention converted into those of a system, a computer program, a recording medium where a computer program is readably recorded, a data structure, or the like are also effective as modes of the present invention.

Advantageous Effects of Invention

The present invention achieves setting assistance of a play area where a user wearing a head mounted display is movable during play of an application.

BRIEF DESCRIPTION OF DRAWINGS

FIG. 2 is a diagram depicting a configuration example of an image display system according to an embodiment.

FIG. 6 is a block diagram depicting function blocks of the image forming device.

FIG. 8 is a diagram schematically depicting a behavior of a user when a play area is set.

FIG. 12 is a diagram depicting an example of a play area editing screen.

FIGS. 13(*a*) to 13(*d*) are diagrams depicting an example of editing for expanding a play area.

FIGS. 14(*a*) to 14(*d*) are diagrams depicting details of a process for setting the play area in the play area editing screen.

FIGS. 15(*a*) to 15(*e*) are diagrams depicting details of a process for expanding the play area.

FIGS. 16(*a*) to 16(*d*) are diagrams depicting an example of editing for reducing the play area.

FIGS. 17(*a*) to 17(*d*) are diagrams depicting details of a process for reducing the play area.

FIGS. 19(*a*) to 19(*d*) are diagrams depicting a modification of editing for expanding the play area.

FIGS. 20(*a*) to 20(*b*) depict a modification of editing for reducing the play area.

DESCRIPTION OF EMBODIMENT

Figure 1:
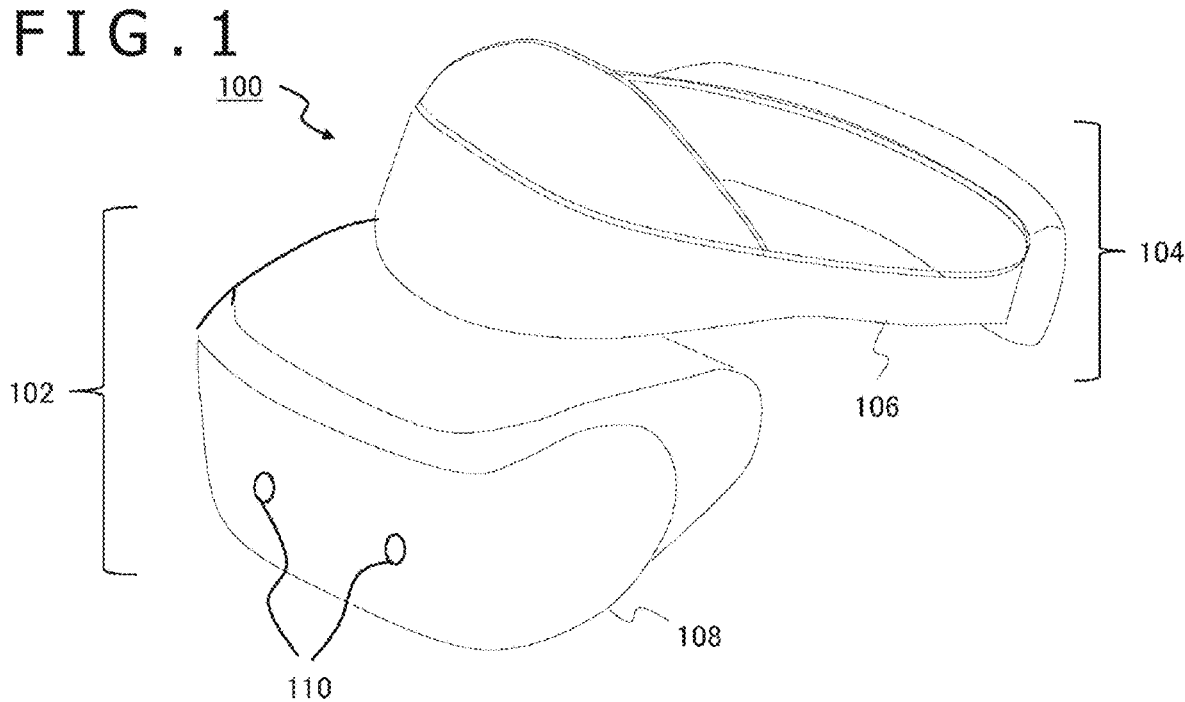
FIG. 1 is a diagram depicting an external appearance example of a head mounted display.

The present embodiment relates to an image display system which displays an image of an application on a head mounted display attached to the head of a user. FIG. 1 depicts an example of an appearance of a head mounted display 100. The head mounted display 100 according to the embodiment includes an output mechanism unit 102 and an attachment mechanism unit 104. The attachment mechanism unit 104 includes an attachment band 106 that is to be attached around the head of the user to achieve fixation of the device when worn by the user.

The output mechanism unit 102 includes a housing 108 so shaped as to cover the left and right eyes of the user in a state where the head mounted display 100 is attached to the user, and accommodates a display panel inside in such a position as to face the eyes in the state of attachment. It is assumed that the display panel of the head mounted display 100 according to the embodiment is not transparent. In other words, the head mounted display 100 according to the embodiment is an opaque-type head mounted display.

The housing 108 may further accommodate an ocular lens inside in such a position as to lie between the display panel and the eyes of the user in the state of attachment of the head mounted display 100, to expand a viewing angle of the user. The head mounted display 100 may further include a speaker and an earphone at a position corresponding to the ear of the user in the state of attachment. Further, the head mounted display 100 has a built-in motion sensor to detect translational motion or rotational motion of the head of the user wearing the head mounted display 100 and a position and a posture of the head at each time.

Further, the head mounted display 100 includes a stereo camera 110 on a front surface of the housing 108. The stereo camera 110 captures a video of a surrounding real space in a visual field corresponding to a visual line of the user. What is generally called video see-through, which presents a state of a real space in a direction where the user faces as it is, is achievable by instant display of a captured image. Moreover, augmented reality (AR) is achievable by drawing an image of a virtual object on an image of a real object contained in a captured image.

FIG. 2 depicts a configuration example of an image display system 10 according to the embodiment. The image display system 10 includes the head mounted display 100, an image forming device 200, and a controller 140. The head mounted display 100 is connected to the image forming device 200 by wireless communication. The image forming device 200 may be further connected to a server via a network. In that case, the server may provide data of an online application, such as a game in which a plurality of users are allowed to participate via the network, to the image forming device 200.

The image forming device 200 is an information processing device which specifies a position of a viewpoint and a direction of a visual line in reference to a position and a posture of the head of the user wearing the head mounted display 100, forms a display image for a visual field corresponding to the specified position and direction, and outputs the display image to the head mounted display 100. For example, the image forming device 200 may form a display image of a virtual world corresponding to a stage of an electronic game while advancing the game, or display a moving image for appreciation or for providing information regardless of whether the moving image is associated with a virtual world or a real world. Moreover, the image forming device 200 is capable of giving the user a sense of deep immersion into a display world by causing the head mounted display 100 to display a panorama image having a wide angle of view around a viewpoint of the user. Note that the image forming device 200 may be either a stationary game machine, or a PC (Personal Computer).

The controller 140 is a controller (e.g., a game controller) which is held by the hand of the user and receives input of an operation performed by a user to control image formation by the image forming device 200 or image display by the head mounted display 100. The controller 140 is connected to the image forming device 200 by wireless communication. In a modification, either one of or both the head mounted display 100 and the controller 140 may be connected to the image forming device 200 by wired communication using a signal cable or the like.

Figure 3:
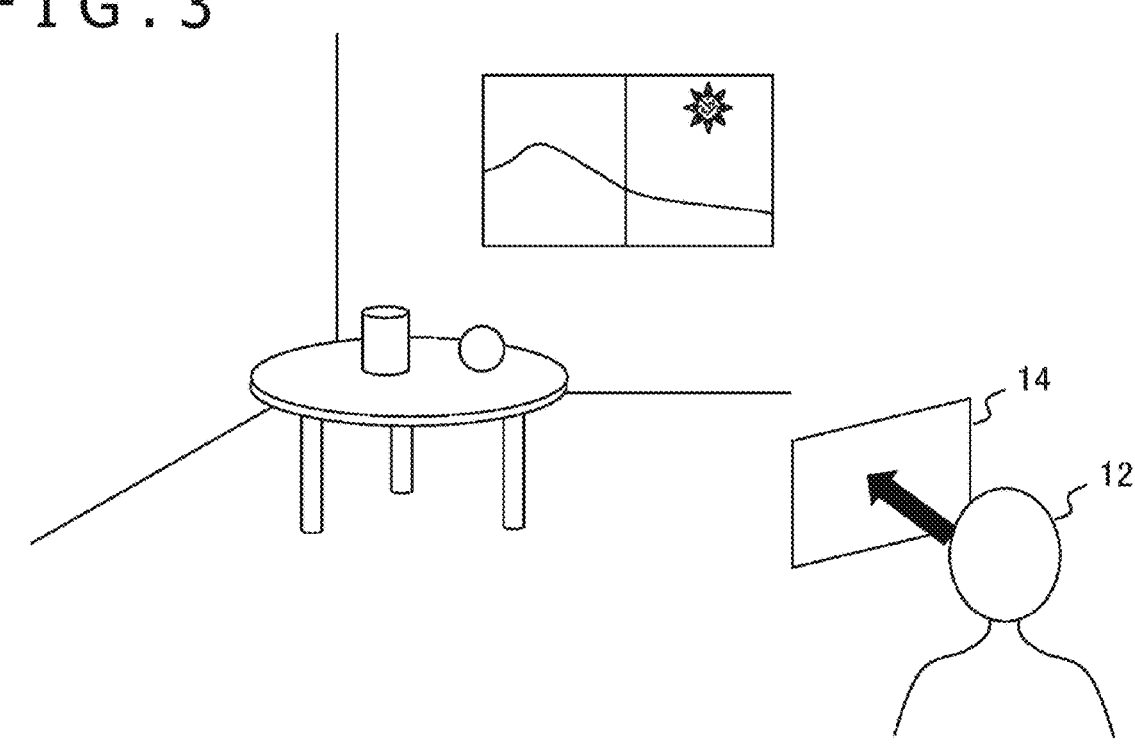
FIG. 3 is a diagram for explaining an example of an image world displayed on the head mounted display by an image forming device.

FIG. 3 is a diagram for explaining an example of an image world displayed by the head mounted display 100 under operation by the image forming device 200. Produced in this example is such a state where a user 12 is present in a room corresponding to a virtual space. As depicted in the figure, such objects as a wall, a floor, a window, a table, and items on the table are arranged in a world coordinate system defining the virtual space. The image forming device 200 defines a view screen 14 in this world coordinate system according to a position of a viewpoint and a direction of a visual line of the user 12, and presents images of the objects in the view screen 14 to draw a display image.

The image forming device 200 acquires the position of the viewpoint and the direction of the visual line of the user 12 (hereinafter these position and direction will collectively be referred to as a "viewpoint" in some cases) from the head mounted display 100 at a predetermined rate, and changes a position and a direction of the view screen 14 according to the acquired position and direction. In this manner, an image is allowed to be displayed by the head mounted display 100 in a visual field corresponding to the viewpoint of the user. Moreover, the image forming device 200 is also capable of presenting a three-dimensional view of the virtual space to the user 12 by forming stereo images having disparity therebetween and causing the head mounted display 100 to display the stereo images in left and right regions of the display panel. In this manner, the user 12 is allowed to experience virtual reality where the user 12 feels as if he or she is present in a room of a display world.

Figure 4:
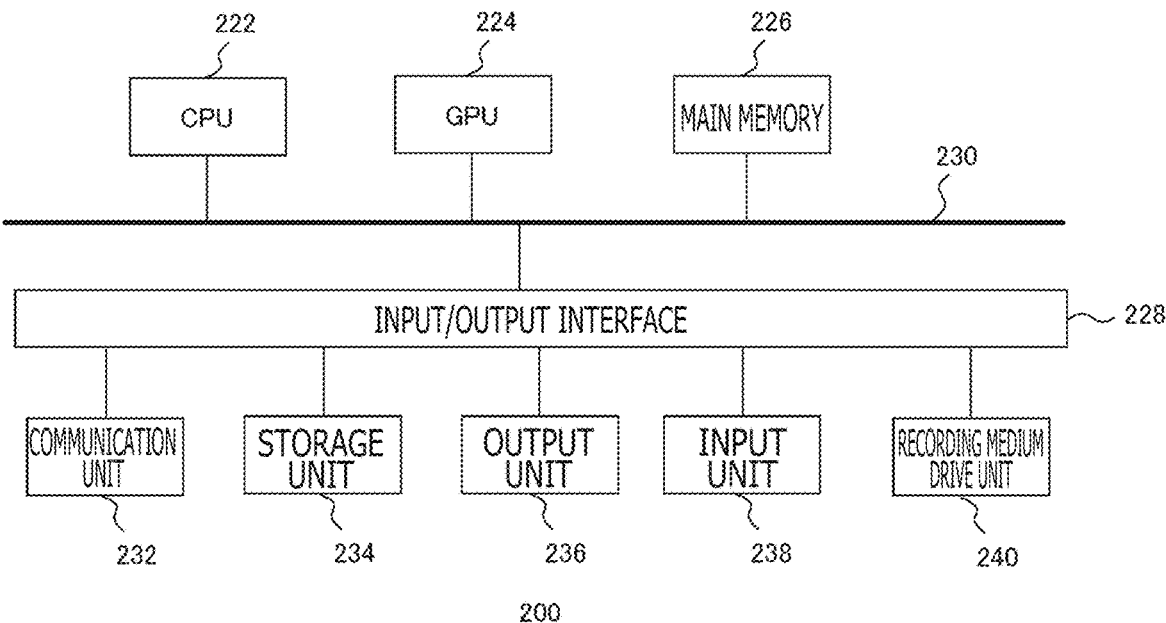
FIG. 4 is a diagram depicting an internal circuit configuration of the image forming device.

FIG. 4 depicts an internal circuit configuration of the image forming device 200. The image forming device 200 includes a CPU (Central Processing Unit) 222, a GPU (Graphics Processing Unit) 224, and a main memory 226. These units are connected to one another via a bus 230. An input/output interface 228 is further connected to the bus 230. A communication unit 232, a storage unit 234, an output unit 236, an input unit 238, and a recording medium drive unit 240 are connected to the input/output interface 228.

The communication unit 232 includes a peripheral device interface such as USB (Universal Serial Bus) and IEEE (Institute of Electrical and Electronics Engineers) 1394, and a network interface such as a wired LAN (Local Area Network) and a wireless LAN. The storage unit 234 includes a hard disk drive, a non-volatile memory, or the like. The output unit 236 outputs data to the head mounted display 100. The input unit 238 receives data input from the head mounted display 100, and receives data input from the controller 140. The recording medium drive unit 240 drives a removable recording medium such as a magnetic disk, an optical disk, or a semiconductor memory.

The CPU 222 executes an operating system stored in the storage unit 234, to control the overall image forming device 200. Moreover, the CPU 222 executes various programs (e.g., VR game applications) read from the storage unit 234 or the removable recording medium and loaded to the main memory 226 or downloaded via the communication unit 232. The GPU 224 having a geometry engine function and a rendering processor function performs an image drawing process in accordance with an image drawing command issued from the CPU 222, and outputs a drawing result to the output unit 236. The main memory 226 includes a RAM (Random Access Memory), and stores a program and data necessary for processing.

Figure 5:
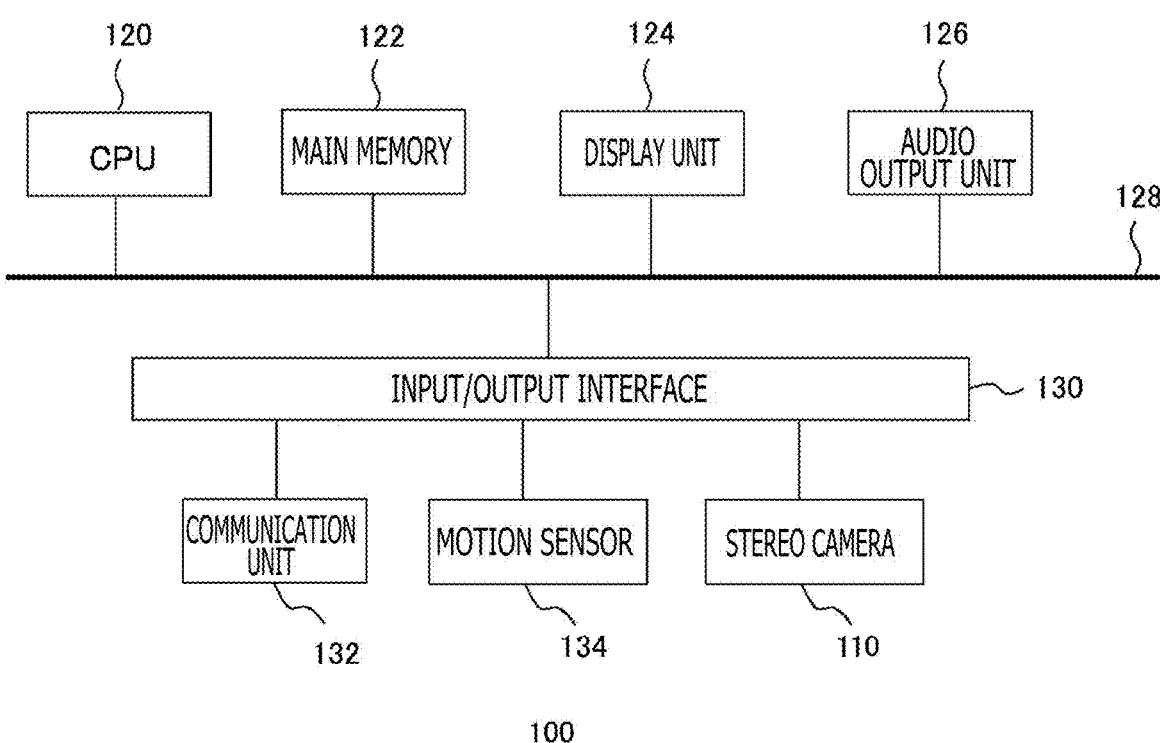
FIG. 5 is a diagram depicting an internal circuit configuration of the head mounted display.

FIG. 5 depicts an internal circuit configuration of the head mounted display 100. The head mounted display 100 includes a CPU 120, a main memory 122, a display unit 124, and an audio output unit 126. These units are connected to one another via a bus 128. An input/output interface 130 is further connected to the bus 128. A communication unit 132 including a wireless communication interface, a motion sensor 134, and the stereo camera 110 are connected to the input/output interface 130.

The CPU 120 processes information acquired from the respective units of the head mounted display 100 via the bus 128, and supplies a display image and audio data acquired from the image forming device 200 to the display unit 124 and the audio output unit 126. The main memory 122 stores a program and data necessary for processing by the CPU 120.

The display unit 124 includes a display panel such as a liquid crystal panel and an organic EL (Electroluminescence) panel, and displays an image before the eyes of the user wearing the head mounted display 100. The display unit 124 may provide a three-dimensional view by displaying a pair of stereo images in regions corresponding to the left and right eyes. The display unit 124 may further include a pair of lenses located between the display panel and the eyes of the user wearing the head mounted display 100, to expand a viewing angle of the user.

The audio output unit 126 includes a speaker and an earphone provided at a position corresponding to the ear of the user wearing the head mounted display 100, to allow the user to hear sounds. The communication unit 132 is an interface for transmitting and receiving data to and from the image forming device 200, and accomplishes communication by a known wireless communication technology such as Bluetooth (registered trademark). The motion sensor 134 includes a gyro sensor and an accelerometer, and acquires angular velocity and acceleration of the head mounted display 100.

As depicted in FIG. 1, the stereo camera 110 includes a pair of video cameras for capturing images of a surrounding real space in a visual field corresponding to a viewpoint of the user from left and right viewpoints, respectively. An image captured by the stereo camera 110 and indicating a space around the user will hereinafter also be referred to as a "camera image." The camera image is also regarded as an image containing objects present in a visual line direction of the user (typically in front of the user). Measurements obtained by the motion sensor 134 and data concerning a captured image (camera image) obtained by the stereo camera 110 are transmitted to the image forming device 200 via the communication unit 132 as necessary.

The image display system 10 according to the embodiment sets a play area specifying a range of a real world where the user wearing the head mounted display 100 is movable while playing an application. The play area is regarded as an area or a range where the user is allowed to move around while viewing and listening to an image of virtual reality (hereinafter also referred to as a "VR image") in a space around the user (a space of the real world extending around the user). In a case where the user attempts to departs from the play area or has departed from the play area while playing the application, the image display system 10 gives the user a warning for calling attention or urging a return to the play area.

The application described above is assumed to be a game application which causes the head mounted display 100 to display a VR image, and will hereinafter also be referred to as a "VR game." For example, the VR game may be a tennis game which displays a VR image representing a tennis court in a virtual world and changes a position of a character in the tennis court of the virtual world in association with movement (e.g., walking) of the user in the real world.

A first feature of the image display system 10 according to the embodiment will be described. In a first step, the image forming device 200 automatically detects a play area where the user wearing the head mounted display 100 is movable while playing the application. In a second step subsequent to the first step, the image forming device 200 receives an operation performed by the user to edit the play area automatically detected, and changes a shape of the play area according to this operation. In this manner, the image forming device 200 assists the user in efficiently setting the play area having a desired shape.

A second feature of the image display system 10 according to the embodiment will be described. The image forming device 200 reduces the play area according to an operation performed by the user when the user manually edits the play area. For example, the image forming device 200 provides a user interface that is to be operated for manual editing of the play area and that is also configured to receive designation of an area excluded from the play area. The image forming device 200 deletes the area designated by the user via the user interface from the play area. In this manner, the image forming device 200 assists the user to efficiently set the desired play area.

A third feature of the image display system 10 according to the embodiment will be described. The image forming device 200 automatically switches an operation mode of an application which forms a VR image taking into consideration a set play area (the VR game according to the embodiment) according to a size of the play area. Specifically, the image forming device 200 determines whether to operate the application in a user movable mode or operate the application in a user unmovable mode according to the size of the set play area. In this manner, the operation mode of the application is automatically switchable according to the size of the play area.

FIG. 6 is a block diagram depicting function blocks of the image forming device. As described above, the image forming device 200 executes ordinary information processing such as advance of the VR game and communication with a server. FIG. 6 particularly depicts details of function blocks associated with settings of a play area. Note that at least some of the functions of the image forming device 200 depicted in FIG. 6 may be mounted on a server connected to the image forming device 200 via a network.

In addition, a plurality of the function blocks depicted in FIG. 6 may be implemented by such configurations as the CPU 222, the GPU 224, the main memory 226, and the storage unit 234 depicted in FIG. 4 in terms of hardware, and may be implemented by a computer program incorporating the functions of the plurality of function blocks in terms of software. Accordingly, it is understood by those skilled in the art that these function blocks may be implemented in various forms such as only hardware, only software, and a combination of the two. It is therefore not intended that these function blocks be limited to any specific form.

The image forming device 200 includes a data processing unit 250 and a data storage unit 252. The data processing unit 250 executes various types of data processing. The data processing unit 250 transmits and receives data to and from the head mounted display 100 and the controller 140 via the communication unit 232, the output unit 236, and the input unit 238 depicted in FIG. 4. The data storage unit 252 stores data referred to or updated by the data processing unit 250.

The data storage unit 252 includes an App storage unit 254, a play area storage unit 256, and a map storage unit 258. The App storage unit 254 stores data of an application forming a VR image (the VR game according to the embodiment).

The play area storage unit 256 stores data associated with a play area. The data associated with the play area includes data indicating positions of a point cloud constituting a boundary of the play area (e.g., coordinate values of respective points in a world coordinate system).

The map storage unit 258 stores map data used for estimating a position of the head mounted display 100 (i.e., a position of the user wearing the head mounted display 100). The map data according to the embodiment corresponds to images (feature points contained in the images) each indicating a room where the user plays the VR game, and includes a set of images (feature points contained in the images) for each of which a positional relation (position and direction) has been clarified. Specifically, the map data includes a plurality of sets of a position of the head mounted display 100, a visual line direction, and a keyframe associated with each other. Note that the map data may include other items necessary for what is generally called self-position estimation.

The keyframe included in a certain set corresponds to data indicating features of an image viewed at a position and in a visual line direction of the same set. The keyframe is an image formed by using an image captured by the stereo camera 110 of the head mounted display 100 (hereinafter also referred to as a "camera image"), and also is an image containing a predetermined number or more of feature points. The number of feature points to be contained in the keyframe may be 24 or larger. The feature points may include a corner detected by a known corner detection method, and may be detected in reference to a slope of luminance. The keyframe is also considered as a set of partial images cut from a camera image.

The data processing unit 250 includes a system unit 260, an App execution unit 290, and a display control unit 292. Functions of a plurality of these function blocks may be incorporated in a computer program. The CPU 222 and the GPU 224 of the image forming device 200 may read the computer program described above from the storage unit 234 or a recording medium into the main memory 226 and execute the computer program to exert the functions of the plurality of function blocks described above.

The App execution unit 290 reads data of an application selected by the user (the VR game according to the embodiment) from the App storage unit 254, and executes the application selected by the user. The display control unit 292 transmits data of various images (e.g., VR image and AR image) formed by the system unit 260 and the App execution unit 290 to the head mounted display 100, and causes the display unit 124 (display panel) of the head mounted display 100 to display these images.

The system unit 260 executes system processing associated with the head mounted display 100. The system unit

260 provides a common service for a plurality of applications (e.g., VR games) for the head mounted display 100. The system unit 260 includes a camera image acquisition unit 262, a play area setting unit 264, a map generation unit 274, a mode determination unit 276, a notification unit 278, a position estimation unit 280, and a warning processing unit 282.

The camera image acquisition unit 262 acquires a camera image transmitted from the head mounted display 100 and captured by the stereo camera 110 of the head mounted display 100.

The play area setting unit 264 which executes various processes for play area setting assistance sets a play area in reference to a camera image acquired by the camera image acquisition unit 262 and an operation input from the user via the controller 140. The play area setting unit 264 includes a play area detection unit 266, a floor surface setting unit 268, a play area editing unit 270, and a temporary setting unit 272.

The play area detection unit 266 automatically detects a play area from a space around the user wearing the head mounted display 100, in reference to the camera image acquired by the camera image acquisition unit 262. The floor surface setting unit 268 receives an operation performed by the user to edit a height of a floor surface detected as a play area by the play area detection unit 266, and changes the height of the floor surface according to this operation.

The play area editing unit 270 receives an operation performed by the user to edit the play area automatically detected by the play area detection unit 266, and changes the shape of the play area according to this operation. For example, the play area editing unit 270 reduces the play area automatically detected by the play area detection unit 266, according to the operation received from the user.

The temporary setting unit 272 sets a temporary play area which is temporarily effective instead of the play area set by the user (i.e., the play area available after manual editing by the user) in a case where the play area set by the user has a size smaller than a predetermined threshold. The temporary play area is a play area where the user is unmovable (in other words, a play area where movement of the user is prohibited), and also is a play area having a fixed shape.

The map generation unit 274 generates a map used for estimating a position of the user in reference to a camera image acquired by the camera image acquisition unit 262, concurrently with detection of the play area by the play area detection unit 266. The map generation unit 274 stores generated map data in the map storage unit 258. The map generation unit 274 ends map generation in a case where a predetermined or larger number of camera images which are a plurality of camera images that indicate a space around the user and that are captured in a plurality of directions are input.

The mode determination unit 276 determines to operate the VR game in a user movable mode or determines to operate the VR game in a user unmovable mode, according to the size of the play area set by the play area setting unit 264 (the play area available after manual editing by the user according to the embodiment). The mode determination unit 276 determines to operate the VR game in the user movable mode in a case where the size of the play area is a predetermined threshold or larger, or determines to operate the VR game in the user unmovable mode in a case where the size of the play area is smaller than the threshold.

The notification unit 278 notifies the App execution unit 290 of information necessary for execution of the VR game by the App execution unit 290. For example, in a case where the mode determination unit 276 determines to operate the VR game in the user movable mode, the notification unit 278 transmits data indicating that the user is movable to the VR game (the App execution unit 290 executing the VR game according to the embodiment). Meanwhile, in a case where the mode determination unit 276 determines to operate the VR game in the user unmovable mode, the notification unit 278 transmits data indicating that the user is unmovable to the VR game (the App execution unit 290 executing the VR game according to the embodiment).

The position estimation unit 280 estimates the position of the user in the real world, i.e., the position of the user in the play area, in reference to map data stored in the map storage unit 258 and a camera image acquired by the camera image acquisition unit 262. For example, the position estimation unit 280 may check a plurality of keyframes included in the map data with the camera image, and estimate the position of the user in reference to this check result and positions of the head mounted display 100 and visual line directions associated with the respective keyframes. Alternatively, the position estimation unit 280 may estimate the position of the user by using a known self-position estimation technology such as SLAM (Simultaneous Localization and Mapping). The warning processing unit 282 executes a warning process for the user according to a relation between a boundary of the play area and the position of the user.

Operation of the image display system 10 configured as above will be described.

Figure 7:
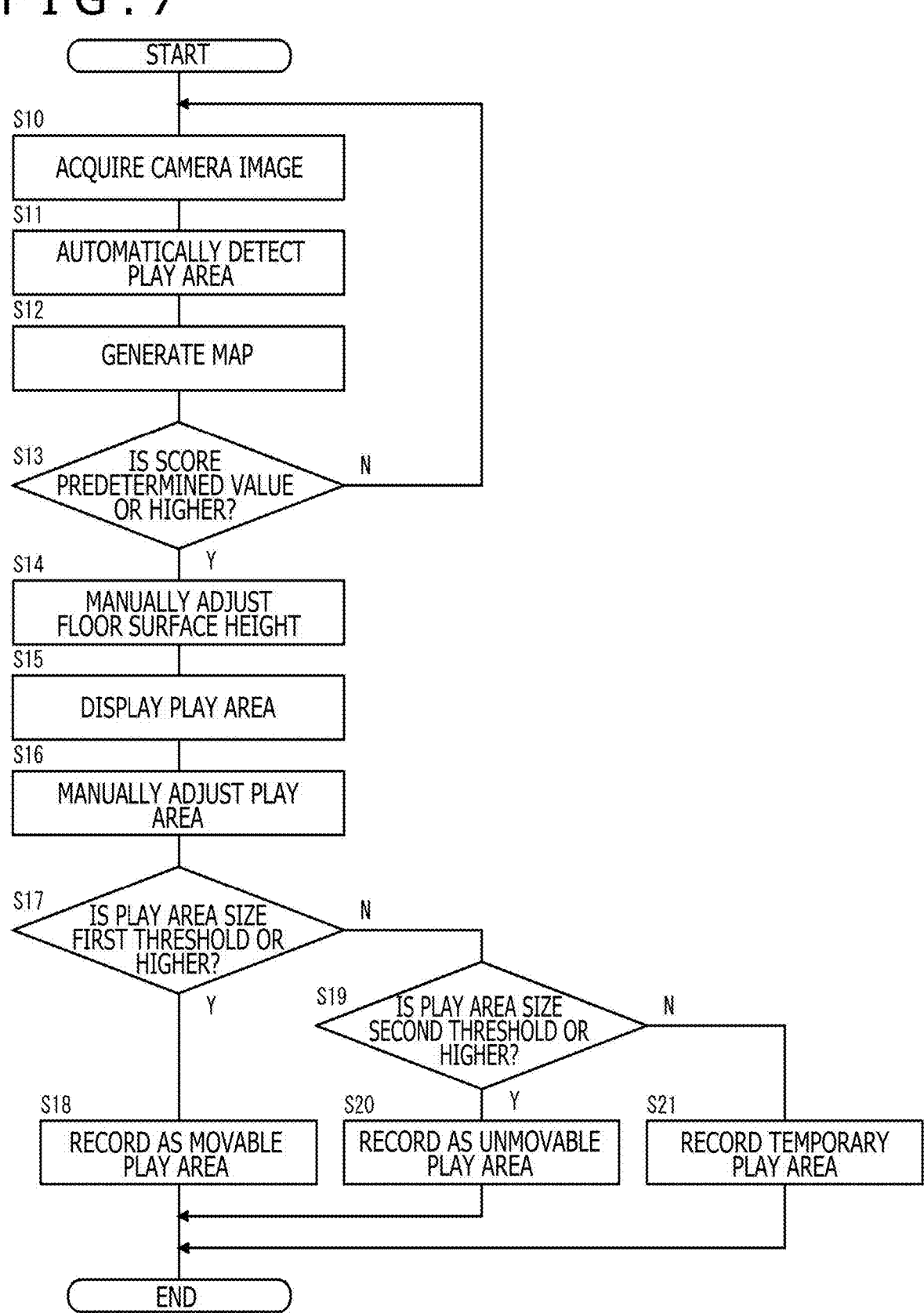
FIG. 7 is a flowchart illustrating operation of the image forming device.

FIG. 7 is a flowchart illustrating operation of the image forming device 200. This figure illustrates operation of the image forming device 200 performed for setting a play area. The user is allowed to select default settings or resetting of the play area from a setting menu of the system of the head mounted display 100. In a case where the default settings or resetting of the play area is selected, the play area setting unit 264 of the image forming device 200 causes the head mounted display 100 to display a message for urging the user to look around, by using the display control unit 292.

Figure 8:
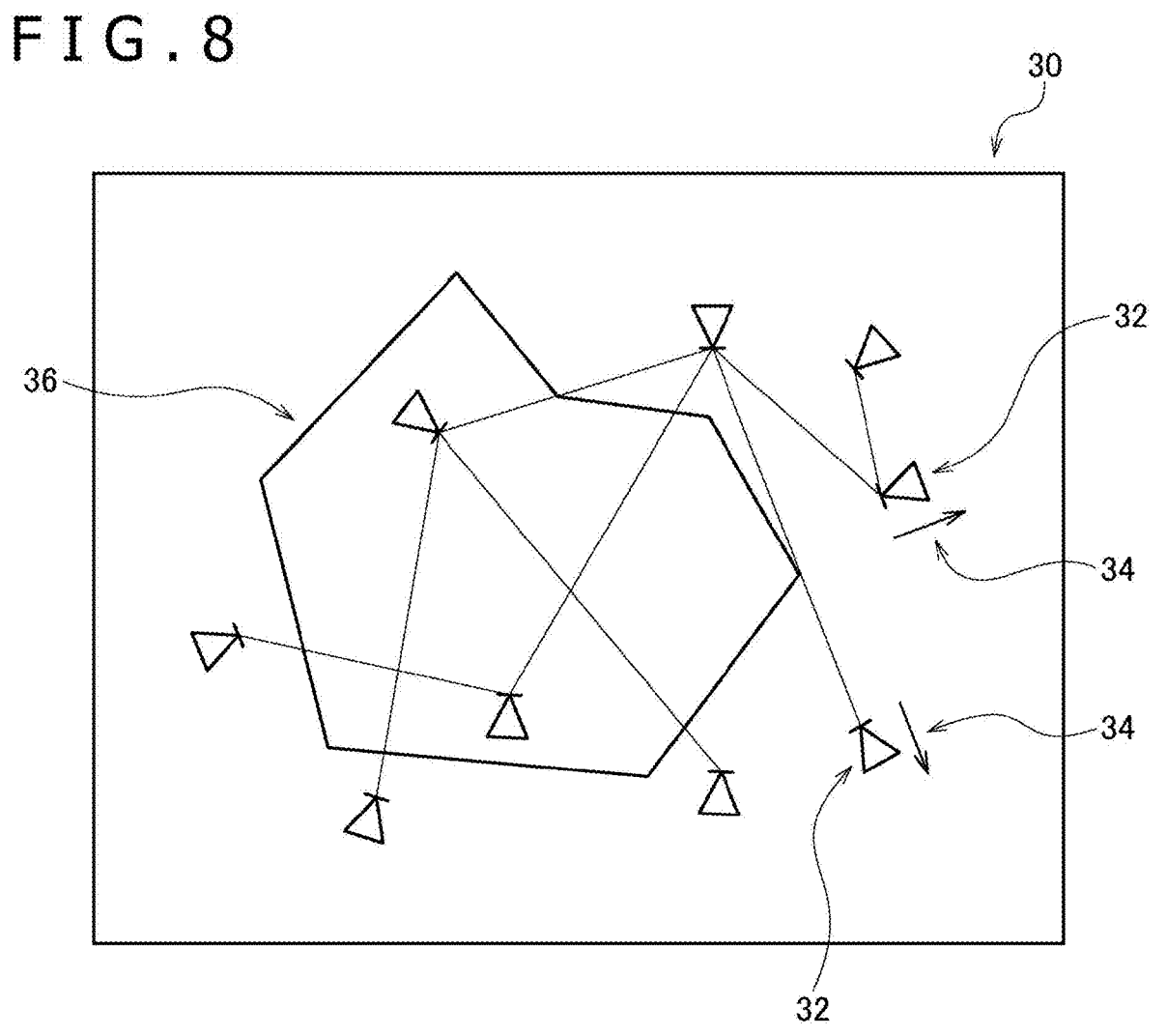

FIG. 8 schematically depicts a behavior of the user performed for setting the play area. The user attaches the head mounted display 100 to his or her head, and moves in a room 30 while looking around. Each of users 32 depicted in FIG. 8 indicates a position of the user at this time. Each of arrows 34 indicates a visual line direction of the user. A play area 36 indicates an example of the play area to be set. During execution of S10 to S12 described below (play area detection process and map generation process), the play area setting unit 264 of the image forming device 200 causes the display panel of the head mounted display 100 to display a camera image acquired by the camera image acquisition unit 262, by using the display control unit 292, in other words, carries out video see-through for presenting to the user a state of a real space in a direction where the user faces as it is. In this manner, safety of the user increases.

The head mounted display 100 sequentially transmits pieces of data of a plurality of camera images to the image forming device 200. Each of the pieces of data of the plurality of camera images includes sensor data at the time of formation of the corresponding camera image. The sensor data includes measurements obtained by the motion sensor 134, such as the angular velocity and acceleration of the head mounted display 100. Described with reference to FIG. 7 again, the camera image acquisition unit 262 of the image forming device 200 acquires the data of the camera images transmitted from the head mounted display 100 (S10).

The play area detection unit 266 of the image forming device 200 automatically detects the play area in the space around the user, in reference to the camera images acquired in S10 (S11). Specifically, the play area detection unit 266 may estimate a 3D shape of the room of the user by using a known method in reference to the camera images and the sensor data corresponding to the camera images. The play area detection unit 266 may detect a plane (typically a floor surface) perpendicular to a gravity direction indicated by the sensor data, in reference to the estimated 3D shape of the room, and detect a result of synthesis of a plurality of detected planes having the same height as the play area. The play area detection unit 266 stores, in the play area storage unit 256, play area data including coordinate values of a point cloud constituting a boundary of the play area.

The play area detection unit 266 detects a height of the floor surface corresponding to the play area, during detection of the play area. The height of the floor surface may be a distance between the floor surface and the head mounted display 100 in the gravity direction. The play area detection unit 266 stores data indicating the height of the floor surface in the play area storage unit 256. In a case where the position of the head mounted display 100 is located at an origin, the height of the floor surface may be a height of −1 meter, for example.

Figure 9:
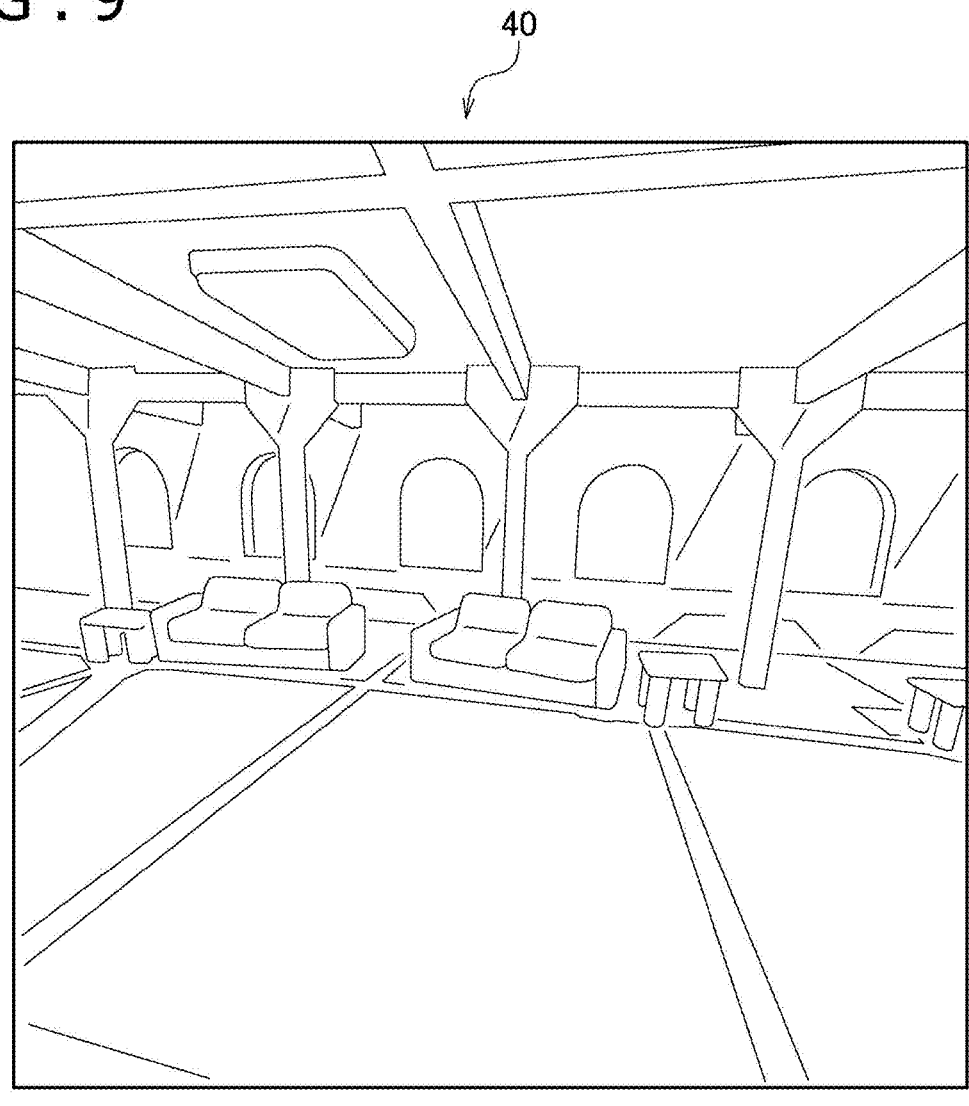
FIG. 9 is a diagram depicting an example of a camera image.
Figure 10:
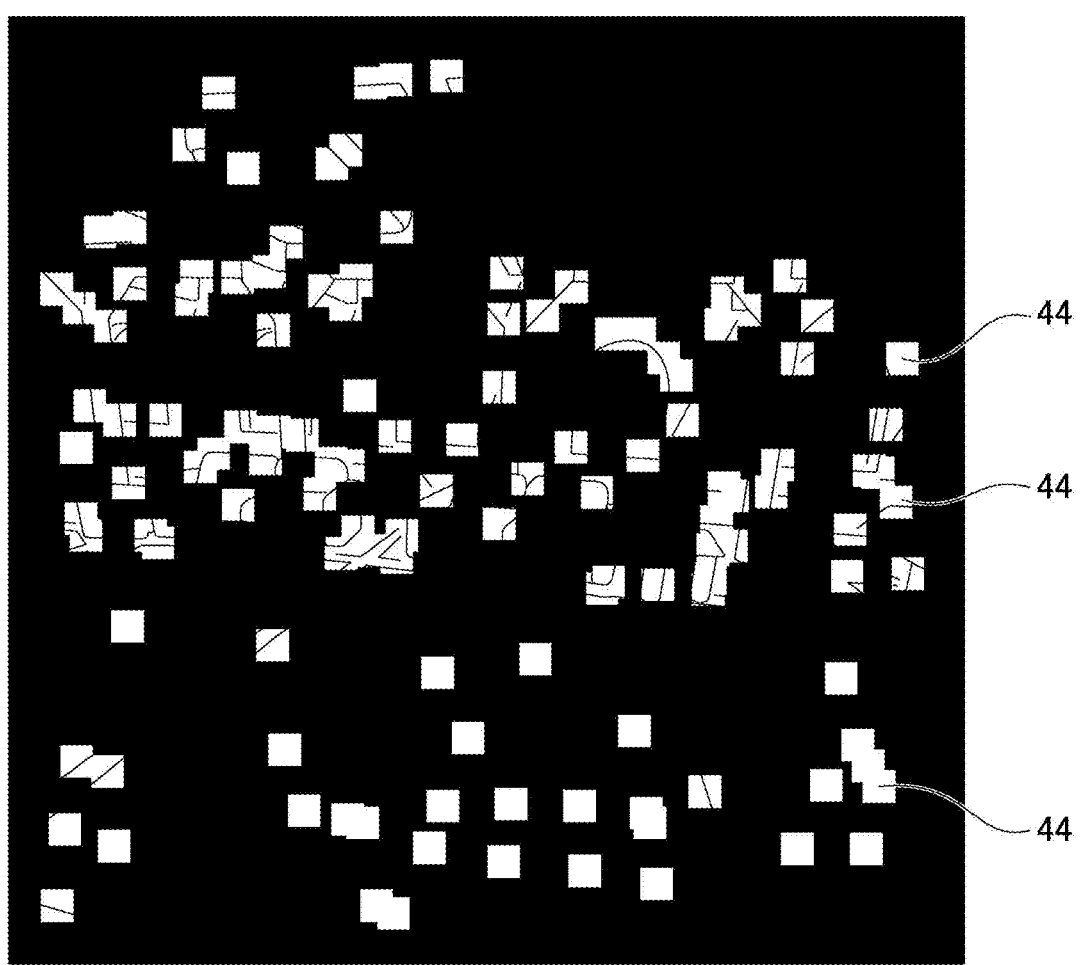
FIG. 10 is a diagram depicting an example of a keyframe.

The map generation unit 274 of the image forming device 200 generates a map to be used for estimating the position of the user, in reference to the camera images acquired in S10, concurrently with the process in S11 (S12). FIG. 9 depicts an example of the camera image, while FIG. 10 depicts an example of a keyframe. The map generation unit 274 extracts a plurality of feature points 44 included in a camera image 40, by using a known method such as a corner detection method, and generates a keyframe 42 indicating the plurality of extracted feature points 44. In a case where 24 or more feature points 44 are extracted from one camera image 40, the map generation unit 274 stores the keyframe 42 including the 24 or more extracted feature points 44 in the map storage unit 258 while associating the keyframe 42 with the position and the visual line direction of the user specified by the sensor data.

The map generation unit 274 stores a plurality of references (hereinafter referred to as "bins") each used for deriving a score indicating a coverage ratio of the input camera image (keyframe generated from the camera image according to the embodiment) to the space around the user. The plurality of bins are a plurality of references dividing the space around the user in different forms.

Figure 11:
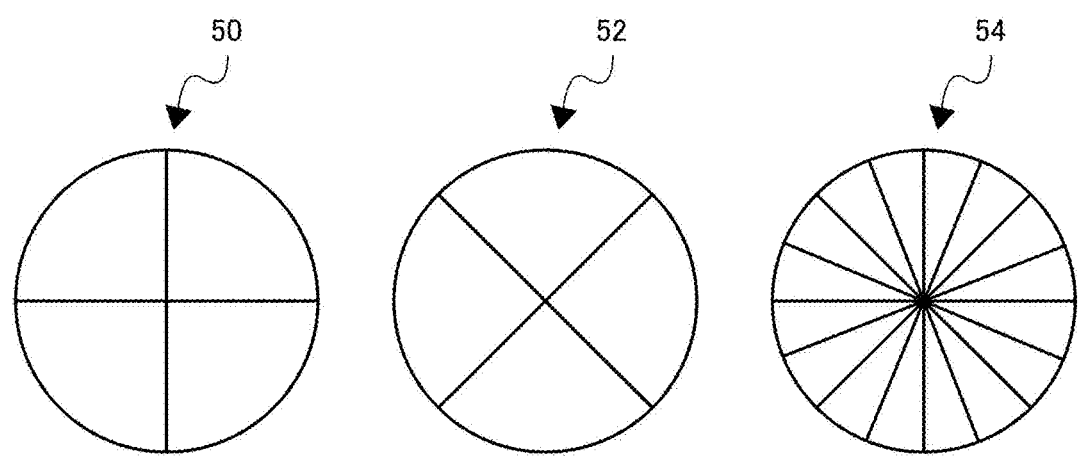
FIG. 11 is a diagram depicting a plurality of bins.

FIG. 11 depicts the plurality of bins. Each of bins 50, 52, and 54 sets the position of the user at a center, and divides the space around the user with an axis aligned with the gravity direction. The bin 50 is a reference which divides the space around the user into four divisions with a center angle of 90 degrees for each, in reference to a visual line direction of the user at a play area setting start and a direction perpendicular to the visual line direction. The bin 52 is a reference after a phase shift by 45 degrees from the bin 50. The bin 54 is a reference which divides the space around the user into 16 divisions with a center angle of 22.5 degrees for each. Areas produced by dividing the space around the user and specified by the corresponding bins 50, 52, and 54 will be hereinafter referred to as "division areas."

The map generation unit 274 derives a score indicating a coverage ratio of a plurality of input camera images (keyframes generated from the camera images according to the embodiment) to the space around the user in reference to the bins 50, 52, and 54. The map generation unit 274 ends the map generation process in a case where the score becomes a predetermined threshold or higher.

Specifically, in a case where a keyframe is generated from a camera image, the map generation unit 274 assumes that a division area coinciding with the visual line direction where the keyframe has been acquired is filled for each of the bins 50, 52, and 54, and counts the total number of filled division areas as a score for each of the bins. When a new keyframe is generated, the map generation unit 274 adds the number of newly filled division areas to the score for each of the bins by using a similar algorithm.

Described with reference to FIG. 7 again, when the score is lower than a threshold "10" (N in S13), the flow returns to S10 to continue the play area detection process and the map generation process, in the embodiment. In a case where the score becomes the threshold "10" or higher (Y in S13), the play area detection unit 266 ends the play area detection process, and the map generation unit 274 ends the map generation process. The threshold "10" of the score is determined as a value which is reached when the user wearing the head mounted display 100 looks around through 180 degrees, but is not reached in a case where the user does not look around.

After execution of the play area detection process and the map generation process, the floor surface setting unit 268 of the image forming device 200 generates a floor surface adjustment screen in reference to data indicating the height of the floor surface and being stored in the play area storage unit 256. The floor surface adjustment screen may include an AR image formed by superimposing an object indicating the floor surface (e.g., semitransparent and grid-shaped object) on a camera image acquired by a camera image acquisition unit 262. The floor surface setting unit 268 causes the display panel of the head mounted display 100 to display the floor surface adjustment screen, by using the display control unit 292. The floor surface setting unit 268 receives an operation input to the floor surface adjustment screen by the user to adjust the height of the floor surface, and changes the height of the floor surface according to the operation input by the user. The floor surface setting unit 268 stores data indicating the changed height of the floor surface in the play area storage unit 256 (S14).

The play area editing unit 270 of the image forming device 200 forms an image indicating the play area automatically detected by the play area detection unit 266. Specifically, the play area editing unit 270 generates a play area editing screen in reference to play area data stored in the play area storage unit 256. The play area editing screen includes an AR image formed by superimposing an object indicating the play area on a camera image acquired by the camera image acquisition unit 262. The display control unit 292 of the image forming device 200 causes the display panel of the head mounted display 100 to display the play area editing screen (S15).

FIG. 12 depicts an example of the play area editing screen. A play area editing screen 60 includes a play area 62 and a boundary 64. The play area 62 is an image indicating a play area (typically a floor surface having no obstacle). For example, the play area 62 may be an image indicating a semitransparent and grid-shaped object. The boundary 64 is an image indicating a boundary of the play area 62, and also an image perpendicularly crossing the play area at the boundary of the play area 62. For example, the boundary 64 may also be a semitransparent and grid-shaped object.

Described with reference to FIG. 7 again, the play area editing unit 270 receives an operation input to the play area editing screen 60 by the user to edit the play area 62. The play area editing unit 270 changes the shape of the play area 62 according to the operation input by the user, i.e., expands or reduces the play area 62 according to the operation input by the user. The play area editing unit 270 stores data of the play area 62 that has been subjected to the shape change (e.g., coordinate values of a point cloud constituting a boundary) in the play area storage unit 256, to update the play area data stored in the play area storage unit 256 (S16).

FIGS. 13(a) to 13(d) are illustrations of the play area editing screen 60 in FIG. 12 as viewed from above, and depict an example of editing for expanding the play area 62. A controller cursor 66 is an object indicating a position designated by an operation input to the controller 140 by the user wearing the head mounted display 100. For example, the controller 140 may have a function as a pointing device, and the play area editing unit 270 may display the controller cursor 66 at a position designated by the controller 140 in a virtual space.

As depicted in FIGS. 13(a) to 13(c), the user moves the controller cursor 66 in the play area editing screen 60 to draw a line extending from the inside of the play area 62 to the outside of the play area 62 and returning to the inside of the play area 62, as a line indicating a movement track of the controller cursor 66. In this case, as depicted in FIG. 13(d), the play area editing unit 270 adds a region surrounded by the drawn line to the play area 62.

Suppose here that the user draws a line extending from the inside of the play area 62 to the outside of the play area 62 and ending outside of the play area 62 as a line indicating a movement track of the controller cursor 66. In this case, the play area editing unit 270 adds a region extending along the drawn line (i.e., the movement track of the controller cursor 66) to the play area 62. For example, in a case where the user ends movement of the controller cursor 66 (i.e., drawing of a line) at a position of the controller cursor 66 indicated in FIG. 13(b), a narrow region extending from the original play area 62 to the right is added to the play area 62.

FIGS. 14(a) to 14(d) depict details of a process for setting the play area in the play area editing screen 60 for editing the play area. As depicted in FIG. 14(a), the play area editing unit 270 acquires data of the play area 62 automatically detected by the play area detection unit 266. As depicted in FIG. 14(b), the play area editing unit 270 converts the play area 62 automatically detected into a grid, i.e., arranges the play area 62 on a grid.

As depicted in FIG. 14(c), the play area editing unit 270 fills the grid inside the play area 62 with objects 68. According to this example, the one object 68 is disposed at one grid intersection. As depicted in FIG. 14(d), the play area editing unit 270 extracts a boundary of the play area 62 in reference to the grid filled with the objects 68, and establishes a boundary line of the play area 62.

FIGS. 15(a) to 15(e) depict details of a process for expanding the play area for editing of the play area. In this case, as depicted in FIG. 15(a), the position of the controller cursor 66 is located inside the play area 62 when the user presses a trigger of the controller 140 (i.e., an input unit that provides an opportunity for the controller cursor 66 to be displayed). The user moves the controller cursor 66 to the outside of the play area 62 while pressing the trigger, and further moves the controller cursor 66 to the inside of the play area 62 and releases the trigger. In this case, as depicted in FIG. 15(b), the play area editing unit 270 fills the grid inside the movement track of the controller cursor 66 with the objects 68 in association with movement of the controller cursor 66.

As depicted in FIG. 15(c), the play area editing unit 270 extracts a boundary of the play area 62 in reference to the grid filled with the objects 68. As depicted in FIG. 15(d), the play area editing unit 270 establishes the boundary of the play area 62 when the user releases the trigger. In a case where a plurality of boundaries exist, the play area editing unit 270 selects a boundary defining a larger range, i.e., an outer boundary. As depicted in FIG. 15(e), the play area editing unit 270 fills the grid inside the boundary with the objects 68.

FIGS. 16(a) to (d) are illustrations of the play area editing screen 60 in FIG. 12 as viewed from above, and depict examples of editing for reducing the play area 62. As depicted in FIGS. 16(a) to 16(c), the user moves the controller cursor 66 in the play area editing screen 60 to draw a line extending from the outside of the play area 62 to the inside of the play area 62 and leaving the play area 62 to the outside as a line indicating a movement track of the controller cursor 66. In this case, as depicted in FIG. 16(d), the play area editing unit 270 deletes one of parts of the play area 62 separated by the drawn line.

According to the embodiment, in a case where the user is present in one of the separated play areas, the play area editing unit 270 detects this state in reference to a position of the user estimated by the position estimation unit 280. In a case where one (e.g., play area 62a in FIG. 16(c)) and the other (e.g., play area 62b in FIG. 16(c)) of the separated play areas correspond to an area where the user is present and an area where the user is absent, respectively, the play area editing unit 270 deletes the area where the user is absent (e.g., play area 62b).

In a modification, the play area editing unit 270 may retain a relatively large, separated play area (e.g., play area 62a) and delete a relatively small, separated play area (e.g., play area 62b). Moreover, in a case where the user is present in any one of the separated play areas, the play area editing unit 270 may delete the separated play area or areas where the user is absent. In a case where the user is present in none of the separated play areas, the play area editing unit 270 may delete a relatively small, separated play area.

Suppose here that the user draws a line extending from the outside of the play area 62 to the inside of the play area 62 and ending inside of the play area 62 as a line indicating a movement track of the controller cursor 66. In this case, the play area editing unit 270 deletes a region extending along the drawn line (i.e., the movement track of the controller cursor 66) from the play area 62. For example, in a case where the user ends movement of the controller cursor 66 at a position of the controller cursor 66 indicated in FIG. 16(b), a region where the controller cursor 66 has passed is deleted from the original play area 62.

FIGS. 17(a) to 17(d) depict details of a process for reducing a play area for play area editing. In this case, as depicted in FIG. 17(a), the position of the controller cursor 66 is located outside the play area 62 when the user presses the trigger of the controller 140. The user moves the controller cursor 66 to the inside of the play area 62 while pressing the trigger, and further moves the controller cursor 66 to the outside of the play area 62 and releases the trigger. In this case, as depicted in FIG. 17(b), the play area editing unit 270 deletes the objects 68 filling the grid within movement track of the controller cursor 66 in association with the movement of the controller cursor 66.

As depicted in FIG. 17(c), the play area editing unit 270 extracts boundaries of the play areas 62 in reference to the grid filled with the objects 68. As depicted in FIG. 17(d), the play area editing unit 270 establishes the boundary of only the play area 62 where the user is present and deletes the play area 62 where the user is absent, when the user releases the trigger.

Description is made with reference to FIG. 7 again. By the processing up to S16, data (e.g., coordinate values of a point cloud constituting the boundary of the play area) of the play area set by the play area setting unit 264, i.e., the play area that is set by the user and that has a desired shape (hereinafter also referred to as a "user setting play area"), is stored in the play area storage unit 256. The mode determination unit 276 of the image forming device 200 derives a size and a shape of the user setting play area in reference to data of the user setting play area.

In a case where the size (including the shape here) of the user setting play area is a predetermined first threshold or larger (Y in S17), the mode determination unit 276 determines that the user setting play area is a movable play area, and determines to operate the VR game in the user movable mode. According to the embodiment, it is determined that the size of the user setting play area is the first threshold or larger in a case where a square having a vertical length of 2 meters and a horizontal length of 2 meters is contained in the user setting play area. The mode determination unit 276 stores data indicating that the user setting play area is a movable play area in the play area storage unit 256 (S18).

In a case where the size of the user setting play area is smaller than the first threshold (N in S17), but equal to or larger than a second threshold smaller than the first threshold (Y in S19), the mode determination unit 276 determines that the user setting play area is an unmovable play area, and determines to operate the VR game in the user unmovable mode. According to the embodiment, it is determined that the size of the user setting play area is the second threshold or larger in a case where a square having a vertical length of 1 meter and a horizontal length of 1 meter is contained in the user setting play area. The mode determination unit 276 stores data indicating that the user setting play area is an unmovable play area in the play area storage unit 256 (S20).

In a case where the size of the user setting play area is smaller than the second threshold, i.e., a square having a vertical length of 1 meter and a horizontal length of 1 meter is not contained in the user setting play area (N in S19), the mode determination unit 276 determines to set a temporary play area. The temporary setting unit 272 causes the head mounted display 100 to display a message indicating that a temporary setting area is to be set, and sets a temporary play area at a position designated by the user via the controller 140. The temporary play area is a play area having a fixed shape (i.e., fixed size) and corresponding to an area where editing by the user is prohibited. According to the embodiment, the temporary play area has a circular shape having a radius of 1.5 meters.

In a case where the temporary play area is set, the temporary setting unit 272 stores data associated with the temporary play area in the play area storage unit 256 instead of data associated with the user setting play area previously stored in the play area storage unit 256. For example, the data associated with the temporary play area includes coordinate values of a point cloud constituting a boundary of the temporary play area. Moreover, the temporary setting unit 272 stores data indicating that the temporary play area is an unmovable play area in the play area storage unit 256 (S21).

Figure 18:
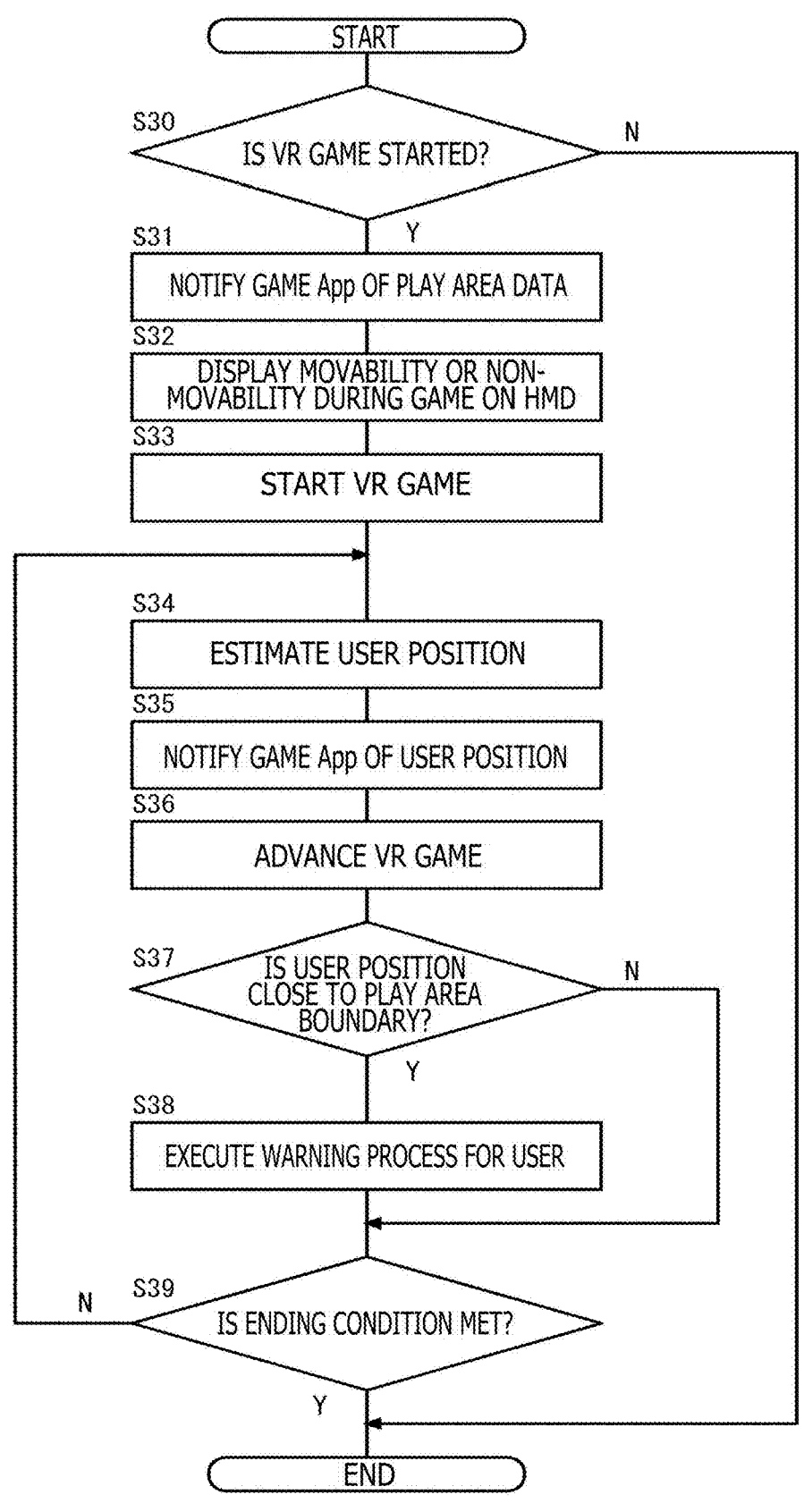
FIG. 18 is a flowchart illustrating operation of the image forming device.

FIG. 18 is also a flowchart illustrating operation of the image forming device 200. This figure illustrates operation of the image forming device 200 during execution of the VR game. When the user starts the VR game by using the image forming device 200 (Y in S30), the notification unit 278 transmits data concerning the play area stored in the play area storage unit 256 (user setting play area or temporary play area), such as data indicating the shape and the size of the play area, to the App execution unit 290. Moreover, the notification unit 278 transmits data indicating that the foregoing play area is a movable play area or an unmovable play area to the App execution unit 290 (S31).

Concurrently with the processing in S31, the notification unit 278 notifies the user of whether the user is movable or unmovable during play of the VR game, by using the display control unit 292 (S32). Specifically, in a case where the mode determination unit 276 determines to operate the VR game in the user movable mode, i.e., in a case where data indicating that the play area is a movable play area is stored in the play area storage unit 256, the display control unit 292 causes the display panel of the head mounted display 100 to display a message indicating that the user is movable during play of the VR game.

On the other hand, in a case where the mode determination unit 276 determines to operate the VR game in the user unmovable mode, i.e., in a case where data indicating that the play area is an unmovable play area is stored in the play area storage unit 256, the display control unit 292 causes the display panel of the head mounted display 100 to display a message indicating that the user is unmovable during play of the VR game. For example, this message may be a message for a warning that movement during play of the VR game is prohibited.

The App execution unit 290 of the image forming device 200 reads program data of the VR game from the App storage unit 254, and starts the VR game (S33). For example, the App execution unit 290 may arrange game items within a range of the play area (including the temporary play area) in a virtual space drawing a game world, to allow the user to acquire these items. The display control unit 292 causes the display panel of the head mounted display 100 to display an image of the VR game formed by the App execution unit 290 (e.g., VR image).

The camera image acquisition unit 262 of the image forming device 200 sequentially acquires camera images sequentially transmitted from the head mounted display 100, and the position estimation unit 280 sequentially estimates the position and the visual line direction of the user in the real world (S34). The notification unit 278 notifies the App execution unit 290 of the position and the visual line of the user estimated by the position estimation unit 280 (S35). The App execution unit 290 advances the VR game according to the position and the visual line direction of the user thus estimated (S36). For example, in a case where the user is in a movable play area, the App execution unit 290 may move a user character in the VR game according to a change of the position of the user in the real world (i.e., in the play area).

In a case where the position of the user in the real world comes close to the boundary of the play area, such as a case where a distance from the head mounted display 100 attached to the user to the boundary of the play area is a predetermined threshold (e.g., 30 centimeters) or shorter (Y in S37), the warning processing unit 282 of the image forming device 200 detects this state. The warning processing unit 282 executes a predetermined warning process for the user (S38).

For example, in a case where the position of the user comes close to the boundary of the play area, the warning processing unit 282 may give an image indicating the boundary of the play area (e.g., boundary 64 depicted in FIG. 12) to the display control unit 292. The display control unit 292 may cause the display panel of the head mounted display 100 to display, as a display image, an image formed by superimposing an image indicating the boundary of the play area on a game image formed by the App execution unit

290. Moreover, in a case where the position of the user in the real world comes close to the boundary of the play area or crosses the boundary of the play area, the warning processing unit 282 may cause the display panel of the head mounted display 100 to display a video see-through image by using the display control unit 292. Further, the warning processing unit 282 may first cause the display panel of the head mounted display 100 to display an image indicating the boundary of the play area in a case where the position of the user in the real world comes close to the boundary of the play area (e.g., 30 centimeters), and may cause the display panel of the head mounted display 100 to display a video see-through image in a case where the position of the user in the real world further moves toward the boundary of the play area (e.g., 10 centimeters). Meanwhile, if the position of the user in the real world is not located close to the boundary of the play area (N in S37), the flow skips S38.

In a case where a predetermined ending condition is met, such as a case where execution of the VR game is stopped by the user (Y in S39), the flow in this figure ends. If the ending condition is not met (N in S39), the flow returns to S34 to continue the VR game. If the VR game is not started (N in S30), the processing in S31 and the following steps is skipped.

The image display system 10 according to the embodiment automatically detects a play area in reference to a camera image captured by the head mounted display 100, and then allows the user to manually edit the play area. Moreover, for the manual editing of the play area, the image display system 10 provides a user interface (play area editing screen 60) capable of achieving both expansion and reduction of the play area. In this manner, the image display system 10 can assist the user to efficiently set the play area having a desired shape.

Moreover, the image display system 10 according to the embodiment automatically determines whether to operate the VR game in the user movable mode, or operate the VR game in the user unmovable mode according to the size of the set play area. This configuration capable of automatically switching the operation mode of the application according to the size of the set play area can reduce a repeated attempt of setting the play area by the user, and improve safety of the user wearing the head mounted display 100 and playing the application.

Further, the application which forms the VR image arranges various objects (e.g., items of the game) in the play area in some cases. Accordingly, it is preferable that the play area have at least a certain size. The image display system 10 according to the embodiment sets a temporary play area having a fixed shape in a case where the user setting play area has a small size (in a case of a size smaller than the second threshold described above). In this manner, the play area has at least a certain size, and any damage to creation of a worldview achieved by image display on the head mounted display 100 (e.g., excitement of VR game) caused by an excessively small size of the play area is avoidable.

The present invention has been described in reference to the embodiment. This embodiment is presented by way of example. It is understood by those skilled in the art that various modifications of combinations of the respective constituent elements or the respective processes for processing may be made, and that these modifications are also included in the scope of the present invention.

A modification associated with manual editing of a play area will be explained.

FIGS. 19(*a*) to 19(*d*) depict a modification of editing for expanding the play area. As depicted in FIGS. 19(*a*) to 19(*c*), as in the embodiment, the user moves the controller cursor 66 in the play area editing screen 60 to draw a line extending from the inside of the play area 62 to the outside of the play area 62 and returning to the inside of the play area 62 as a line indicating a movement track of the controller cursor 66. In this case, as depicted in FIG. 19(*d*), the play area editing unit 270 adds a region surrounded by the drawn line to the play area 62. Note that a width of the line indicating the movement track of the controller cursor 66 in the modification is smaller than a width of the line indicating the movement track of the controller cursor 66 in the embodiment.

Suppose here that the user draws a line extending from the inside of the play area 62 to the outside of the play area 62 and ending outside of the play area 62 as a line indicating a movement track of the controller cursor 66. In this case, the play area editing unit 270 maintains the previous shape of the play area 62 in the present modification. In other words, the play area editing unit 270 cancels the drawn line, i.e., does not expand the play area 62.

FIGS. 20(*a*) and (*b*) depict a modification of editing for reducing the play area. As depicted in FIG. 20(*a*), as in the embodiment, the user moves the controller cursor 66 in the play area editing screen 60 to draw a line extending from the outside of the play area 62 to the inside of the play area 62, and leaving the play area 62 to the outside as a line indicating a movement track of the controller cursor 66. In this case, as depicted in FIG. 20(*b*), the play area editing unit 270 deletes one of parts of the play area 62 separated by the drawn line. In a case where one and the other of the separated play areas correspond to an area where the user is present and an area where the user is absent, respectively, the play area editing unit 270 deletes the area where the user is absent.

Suppose here that the user draws a line extending from the outside of the play area 62 to the inside of the play area 62 and ending inside of the play area 62 as a line indicating a movement track of the controller cursor 66. In this case, the play area editing unit 270 maintains the previous shape of the play area 62 in the present modification. In other words, the play area editing unit 270 cancels the drawn line, i.e., does not reduce the play area 62.

Any combinations of the embodiment and the modification described above are also effective as modes for carrying out the present disclosure. New modes produced by the combinations have respective advantageous effects offered by the embodiment and the modification thus combined. Moreover, it is also understood by those skilled in the art that functions to be exerted by respective constituent elements described in the claims are achieved by the respective constituent elements which are included in the embodiment and the modification, either alone or in cooperation with each other.

The technical ideas described in the embodiment and the modification can be expressed in the following respective items.

Item 1-1

An information processing device including:

a play area detection unit that automatically detects a play area where a user wearing a head mounted display is movable during play of an application, in reference to a camera image that indicates a space around the user and that is captured by a camera of the head mounted display;

a display control unit that causes the head mounted display to display an image representing the play area automatically detected by the play area detection unit; and a play area editing unit that receives an operation performed by the user to edit the play area, and changes a shape of the play area according to the operation.

This information processing device can assist the user in efficiently setting a play area having a desired shape.

Item 1-2

The information processing device according to Item 1-1, further including:

a map generation unit that generates a map to be used for estimating a position of the user, in reference to the camera image, concurrently with detection of the play area by the play area detection unit, in which the map generation unit ends a map generation process for generating the map in a case where a predetermined or larger number of camera images that are a plurality of camera images that indicate the space around the user and that are captured in a plurality of directions are input.

This information processing device can increase accuracy of estimation of the position of the user.

Item 1-3

The information processing device according to Item 1-2, in which the map generation unit derives a score indicating a coverage ratio of a plurality of input camera images to the space around the user, in reference to a plurality of references dividing the space around the user in different forms, and ends the map generation process in a case where the score becomes a predetermined threshold or higher.

This information processing device can increase completeness of the map used for estimating the position of the user.

Item 1-4

An information processing method executed by a computer, the method including:

a step of automatically detecting a play area where a user wearing a head mounted display is movable during play of an application, in reference to a camera image that indicates a space around the user and that is captured by a camera of the head mounted display;

a step of causing the head mounted display to display an image representing the automatically detected play area; and a step of receiving an operation performed by the user to edit the play area, and changing a shape of the play area according to the operation.

This information processing method allows the computer to assist the user in efficiently setting a play area having a desired shape.

Item 1-5

A computer program for causing a computer to achieve:

a function of automatically detecting a play area where a user wearing a head mounted display is movable during play of an application, in reference to a camera image that indicates a space around the user and that is captured by a camera of the head mounted display;

a function of causing the head mounted display to display an image representing the automatically detected play area; and a function of receiving an operation performed by the user to edit the play area, and changing a shape of the play area according to the operation.

This computer program allows the computer to assist the user in efficiently setting a play area having a desired shape.

Item 2-1

An information processing device including:

a storage unit that stores a play area where a user wearing a head mounted display is movable during play of an application in a space around the user;

a display control unit that causes the head mounted display to display an image representing the play area stored in the storage unit; and a play area editing unit that receives an operation performed by the user to edit the play area, and reduces the play area according to the operation performed by the user.

This information processing device can assist the user in efficiently setting a play area having a desired shape.

Item 2-2

The information processing device according to Item 2-1, further including:

a play area detection unit that automatically detects the play area in reference to a camera image that indicates the space around the user and that is captured by a camera of the head mounted display, in which the play area editing unit reduces the play area automatically detected by the play area detection unit, according to the operation performed by the user.

This information processing device can assist the user in setting a play area having a desired shape.

Item 2-3

The information processing device according to Item 2-1 or 2-2, in which, in a case where the user draws a line extending from the outside of the play area to the inside of the play area and leaving the play area to the outside, the play area editing unit deletes one of parts of the play area separated by the line.

This information processing device can provide a user interface capable of deleting an unnecessary play area by an intuitive operation.

Item 2-4

The information processing device according to Item 2-3, in which, in a case where one and the other of the separated parts of the play area by the line correspond to an area where the user is present and an area where the user is absent, respectively, the play area editing unit deletes the area where the user is absent.

This information processing device can provide a user interface capable of deleting an unnecessary play area by an intuitive operation.

Item 2-5

The information processing device according to Item 2-3 or 2-4, in which, in a case where the user draws a line extending from the outside of the play area to the inside of the play area and ending inside of the play area, the play area editing unit deletes a region extending along the line from the play area.

This information processing device can provide a user interface capable of deleting an unnecessary play area by an intuitive operation.

Item 2-6

The information processing device according to Item 2-3 or 2-4, in which, in a case where the user draws a line extending from the outside of the play area to the inside of the play area and ending inside of the play area, the play area editing unit maintains the previous shape of the play area.

This information processing device can prevent deletion of the play area against the intent of the user.

Item 2-7

The information processing device according to Item 2-3, in which, in a case where the user draws a line extending from the inside of the play area to the outside of the play area and returning to the inside of the play area, the play area editing unit adds a region surrounded by the line to the play area.

This information processing device can provide a user interface capable of expanding the play area by an intuitive operation.

Item 2-8

The information processing device according to Item 2-7, in which, in a case where the user draws a line extending from the inside of the play area to the outside of the play area and ending outside of the play area, the play area editing unit adds a region extending along the line to the play area.

This information processing device can provide a user interface capable of expanding the play area by an intuitive operation.

Item 2-9

The information processing device according to Item 2-7, in which, in a case where the user draws a line extending from the inside of the play area to the outside of the play area, and ending outside of the play area, the play area editing unit maintains the previous shape of the play area.

This information processing device can prevent expansion of the play area against the intent of the user.

Item 2-10

An information processing method executed by a computer including a storage unit that stores a play area where a user wearing a head mounted display is movable during play of an application in a space around the user, the method including:

a step of causing the head mounted display to display an image representing the play area stored in the storage unit; and a step of receiving an operation performed by the user to edit the play area, and reducing the play area according to the operation performed by the user.

This information processing method allows the computer to assist the user in setting a play area having a desired shape.

Item 2-11

A computer program for causing a computer including a storage unit that stores a play area where a user wearing a head mounted display is movable during play of an application in a space around the user, to achieve:

a function of causing the head mounted display to display an image representing the play area stored in the storage unit; and a function of receiving an operation performed by the user to edit the play area, and reducing the play area according to the operation performed by the user.

This computer program allows the computer to assist the user in setting a play area having a desired shape.

Item 3-1

An information processing device including:

a play area setting unit that sets a play area where a user wearing a head mounted display is movable during play of an application in a space around the user; and a determination unit that determines to operate the application in a user movable mode, or determines to operate the application in a user unmovable mode according to a size of the play area set by the play area setting unit.

This information processing device can increase safety of the user wearing the head mounted display and playing the application.

Item 3-2

The information processing device according to Item 3-1, in which the determination unit determines to operate the application in the user movable mode in a case where the size of the play area is a predetermined first threshold or higher, and determines to operate the application in the user unmovable mode in a case where the size of the play area is smaller than the first threshold.

This information processing device can increase safety of the user wearing the head mounted display and playing the application.

Item 3-3

The information processing device according to Item 3-2, in which the play area setting unit sets a temporary play area which is a user unmovable play area and has a fixed shape, instead of the play area set by the user, in a case where the play area set by the user has a size smaller than a second threshold smaller than the first threshold.

This information processing device can secure a certain size of the play area, and prevent damage to creation of a worldview achieved by image display on the head mounted display caused by an excessively small size of the play area.

Item 3-4

The information processing device according to any one of Items 3-1 to 3-3, further including:

a notification unit that notifies the application of a fact that the user is movable in a case where the determination unit determines to operate the application in the user movable mode, and notifies the application of a fact that the user is unmovable in a case where the determination unit determines to operate the application in the user unmovable mode.

This information processing device can operate the application in a mode appropriate for the size of the play area.

Item 3-5

The information processing device according to any one of Items 3-1 to 3-4, further including:

a display control unit that causes the head mounted display to display a fact that the user is unmovable during play of the application in a case where the determination unit determines to operate the application in the user unmovable mode.

This information processing device can notify the user of a fact that the user is unmovable during play of the application.

Item 3-6

An information processing method executed by a computer, the method including:

a step of setting a play area where a user wearing a head mounted display is movable during play of an application in a space around the user; and a step of determining to operate the application in a user movable mode, or determining to operate the application in a user unmovable mode, according to a size of the set play area.

This information processing method can increase safety of the user wearing the head mounted display and playing the application.

Item 3-7

A computer program for causing a computer to achieve:

a function of setting a play area where a user wearing a head mounted display is movable during play of an application in a space around the user; and a function of determining to operate the application in a user movable mode, or determining to operate the application in a user unmovable mode, according to a size of the set play area.

This computer program can increase safety of the user wearing the head mounted display and playing the application.

INDUSTRIAL APPLICABILITY

The present invention is applicable to a device or a system which causes a head mounted display to display an image of an application.

REFERENCE SIGNS LIST

10: Image display system
100: Head mounted display
200: Image forming device
256: Play area storage unit
264: Play area setting unit
266: Play area detection unit
270: Play area editing unit
272: Temporary setting unit
274: Map generation unit
276: Mode determination unit
292: Display control unit

The invention claimed is:

1. An information processing device comprising a circuitry configured to:

automatically detect a play area where a user wearing a head mounted display is movable during play of an application, in reference to a camera image that indicates a space around the user and that is captured by a camera of the head mounted display;

cause the head mounted display to display an image representing the play area; and receive an operation performed by the user to edit the play area, and changes a shape of the play area according to the operation; and generate a map to be used for estimating a position of the user, in reference to the camera image, concurrently with detection of the play area, wherein the map generation process comprises deriving a score indicating a coverage ratio of a plurality of input camera images to the space around the user in reference to a plurality of references dividing the space around the user in different forms, and ending the map generation process in a case where the score becomes a predetermined threshold or higher.

2. An information processing method executed by a computer, the method comprising:

automatically detecting a play area where a user wearing a head mounted display is movable during play of an application, in reference to a camera image that indicates a space around the user and that is captured by a camera of the head mounted display;

causing the head mounted display to display an image representing the automatically detected play area;

receiving an operation performed by the user to edit the play area, and changing a shape of the play area according to the operation; and generating a map to be used for estimating a position of the user, in reference to the camera image, concurrently with detection of the play area, wherein the map generation process comprises deriving a score indicating a coverage ratio of a plurality of input camera images to the space around the user in reference to a plurality of references dividing the space around the user in different forms, and ending the map generation process in a case where the score becomes a predetermined threshold or higher.

3. A computer program for a computer, comprising:

automatically detecting a play area where a user wearing a head mounted display is movable during play of an application, in reference to a camera image that indicates a space around the user and that is captured by a camera of the head mounted display;

causing the head mounted display to display an image representing the automatically detected play area;

receiving an operation performed by the user to edit the play area, and changing a shape of the play area according to the operation; and generating a map to be used for estimating a position of the user, in reference to the camera image, concurrently with detection of the play area, wherein the map generation process comprises deriving a score indicating a coverage ratio of a plurality of input camera images to the space around the user in reference to a plurality of references dividing the space around the user in different forms, and ending the map generation process in a case where the score becomes a predetermined threshold or higher.

\* \* \* \* \*